(12) United States Patent
Truckai et al.

(10) Patent No.: US 12,458,394 B2
(45) Date of Patent: Nov. 4, 2025

(54) METHODS AND DEVICES FOR RESECTING TISSUE

(71) Applicant: Meditrina, Inc., San Jose, CA (US)

(72) Inventors: Tamas J. Truckai, Saratoga, CA (US); Csaba Truckai, Saratoga, CA (US)

(73) Assignee: Meditrina, Inc., San Jose, CA (US)

( * ) Notice: Subject to any disclaimer, the term of this patent is extended or adjusted under 35 U.S.C. 154(b) by 0 days.

(21) Appl. No.: 16/995,217

(22) Filed: Aug. 17, 2020

(65) Prior Publication Data

US 2022/0047294 A1 Feb. 17, 2022

(51) Int. Cl.
*A61B 17/3207* (2006.01)
*A61B 17/32* (2006.01)

(52) U.S. Cl.
CPC .......... *A61B 17/320783* (2013.01); *A61B 17/32002* (2013.01); *A61B 2017/320024* (2013.01); *A61B 2017/320028* (2013.01); *A61B 2017/320032* (2013.01); *A61B 17/320758* (2013.01); *A61B 2017/320766* (2013.01)

(58) Field of Classification Search
CPC .......... A61B 17/320783; A61B 2017/320032; A61B 17/32002; A61B 17/320758; A61B 17/3207; A61B 17/32001; A61B 2017/320024–320028; A61B 2017/320766–320775
See application file for complete search history.

(56) References Cited

U.S. PATENT DOCUMENTS

| | | | |
|---|---|---|---|
| 4,815,642 A * | 3/1989 | Ray | A43B 5/0425 224/220 |
| 5,423,845 A * | 6/1995 | McDaniel | A61B 17/142 606/178 |
| 5,755,731 A * | 5/1998 | Grinberg | A61B 17/32002 606/180 |
| 6,053,928 A | 4/2000 | Van Wyk et al. | |
| 6,342,061 B1 * | 1/2002 | Kauker | A61M 1/72 606/180 |
| 8,313,502 B2 * | 11/2012 | Heisler | A61B 17/32002 606/171 |
| 9,839,441 B2 | 12/2017 | Hayes et al. | |
| 12,029,455 B2 * | 7/2024 | Gokcen | A61B 17/7225 |
| 2006/0196038 A1 * | 9/2006 | Van Wyk | A61B 17/32002 29/557 |
| 2006/0212060 A1 | 9/2006 | Hacker et al. | |
| 2008/0021488 A1 * | 1/2008 | Berberich | A61B 17/32002 606/170 |
| 2008/0243153 A1 * | 10/2008 | Nguyen | A61B 17/32037 606/159 |
| 2011/0196400 A1 * | 8/2011 | Robertson | A61B 17/22004 606/169 |
| 2012/0239064 A1 * | 9/2012 | Cartier | A61B 17/320725 606/159 |

(Continued)

FOREIGN PATENT DOCUMENTS

EP 1698290 B1 11/2009

*Primary Examiner* — Darwin P Erezo
*Assistant Examiner* — Mitchell Brian Hoag
(74) *Attorney, Agent, or Firm* — Levine Bagade Han LLP

(57) ABSTRACT

Devices and methods for resecting tissue from the interior of a patient's body with a motor-driven rotating tubular cutter and multiple cutting windows located at a working end of the resecting device.

15 Claims, 21 Drawing Sheets

(56) References Cited

U.S. PATENT DOCUMENTS

| | | | |
|---|---|---|---|
| 2013/0274751 A1* | 10/2013 | Steinwachs | A61B 17/1604 606/84 |
| 2013/0331833 A1* | 12/2013 | Bloom | A61B 18/1445 606/45 |
| 2014/0277040 A1* | 9/2014 | Hayes | A61B 17/32002 606/170 |
| 2015/0073418 A1* | 3/2015 | Landes | A61B 17/32 606/84 |
| 2015/0105791 A1* | 4/2015 | Truckai | A61B 17/00234 606/115 |
| 2015/0209080 A1* | 7/2015 | Sullivan | A61B 17/32053 606/119 |
| 2016/0262769 A1* | 9/2016 | Cragg | A61B 17/12109 |
| 2016/0346036 A1* | 12/2016 | Orczy-Timko | A61B 18/1206 |
| 2017/0056047 A1* | 3/2017 | Keller | A61B 90/92 |
| 2017/0333127 A1* | 11/2017 | Germain | A61B 17/32002 |
| 2018/0085138 A1* | 3/2018 | Preiss | A61B 17/32002 |
| 2019/0021765 A1* | 1/2019 | Magno | A61B 17/42 |
| 2019/0105071 A1 | 4/2019 | Magno, Jr. | |
| 2019/0290327 A1* | 9/2019 | Magno | A61B 17/3205 |
| 2019/0298403 A1* | 10/2019 | Willhite | A61B 17/32002 |
| 2019/0321095 A1* | 10/2019 | Germain | A61B 90/98 |
| 2019/0374246 A1 | 12/2019 | Malkevich et al. | |
| 2020/0146703 A1 | 5/2020 | Truckai et al. | |
| 2020/0246029 A1* | 8/2020 | Singleton | A61B 17/320725 |
| 2020/0405495 A1* | 12/2020 | Gatrell | A61B 17/1684 |
| 2021/0007793 A1* | 1/2021 | Germain | A61B 18/042 |
| 2021/0128188 A1 | 5/2021 | Truckai et al. | |
| 2021/0169513 A1* | 6/2021 | Wood | A61B 17/32002 |
| 2021/0282799 A1* | 9/2021 | Curtin | A61B 17/32002 |
| 2022/0323073 A1* | 10/2022 | Gurtner | A61B 17/10 |
| 2022/0378457 A1* | 12/2022 | Fugerer | G16H 40/63 |
| 2022/0387060 A1 | 12/2022 | Truckai et al. | |

* cited by examiner

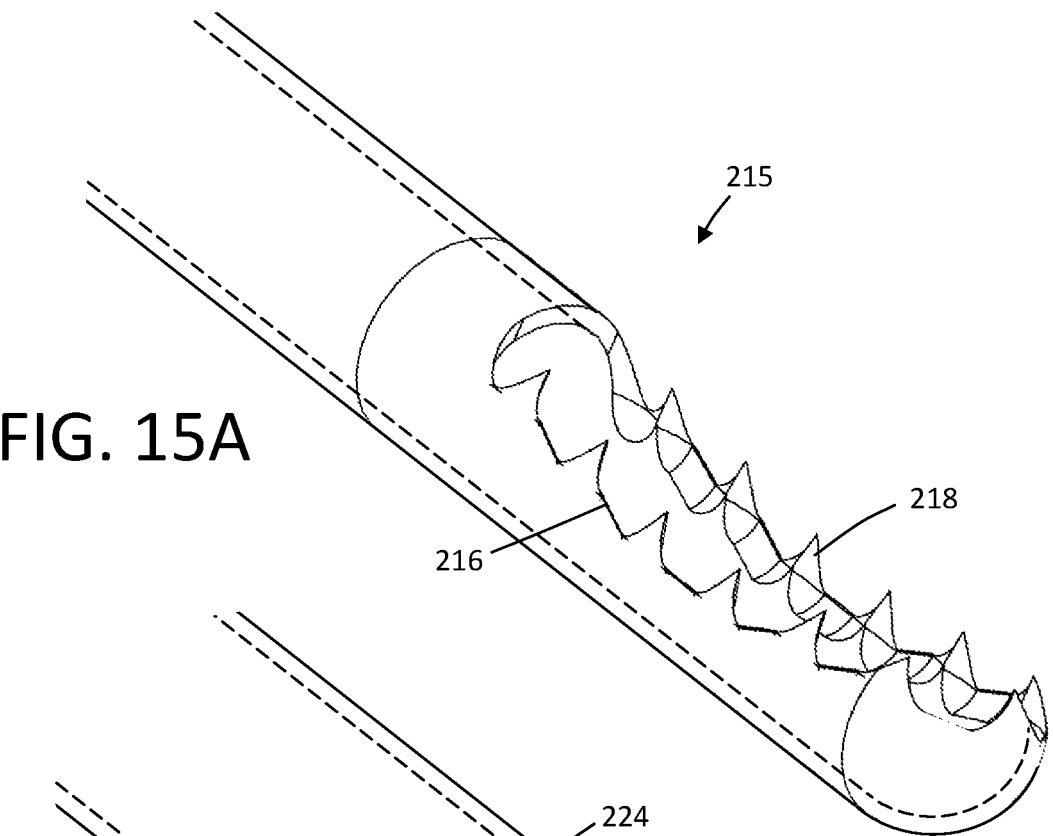
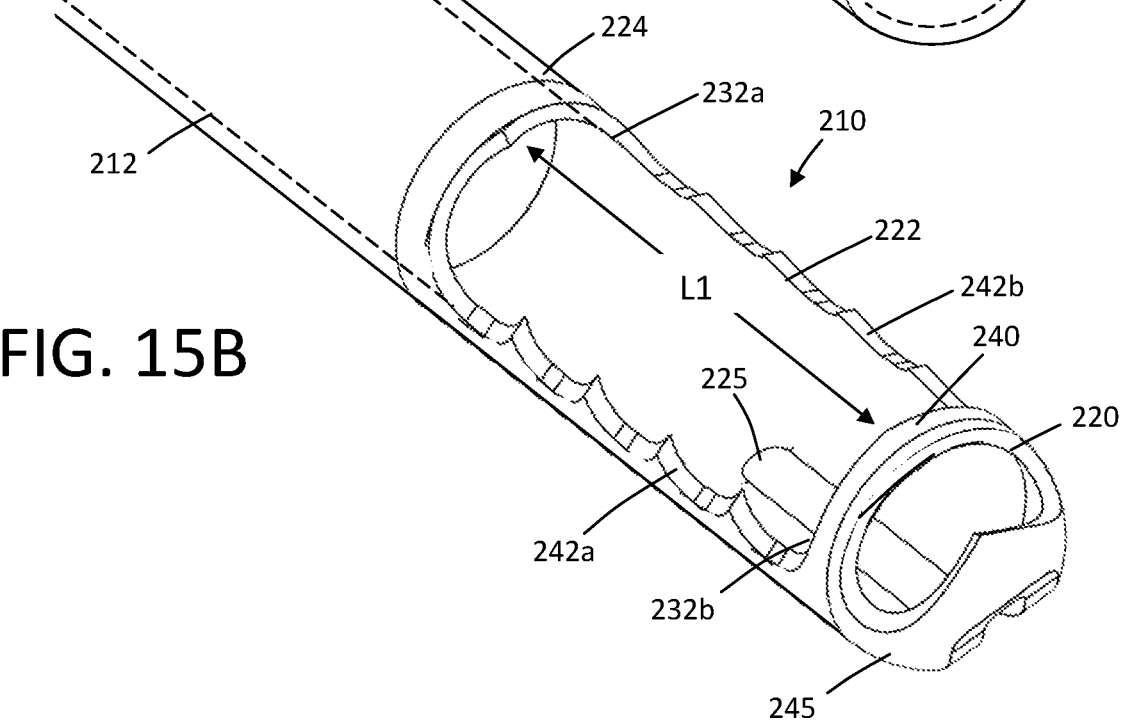

METHODS AND DEVICES FOR RESECTING TISSUE

BACKGROUND OF THE INVENTION

Field of the Invention

The present disclosure relates to an instrument and method for resecting tissue from the interior of a patient's body with a motor-driven rotating tubular cutter.

SUMMARY

Some aspects in accordance with principles of the present disclosure relate to a tissue-resecting device for use with a powered surgical tool. The resection device or instrument includes an outer sleeve assembly and a coaxial inner sleeve assembly. The outer sleeve comprises a tubular member extending distally to a typically rounded distal end, with a cutting window in the distal region thereof. The window may have a sharp beveled edge but more often has window edges with a plurality of sharp teeth for engaging and gripping tissue. The inner sleeve also has a cutting tip which includes a windowed cutting edge configured with exceptionally sharp teeth that are adapted to perform two functions. First, a needle-like tip of each tooth is configured to pierce and grip tissue, and a second lower blade edge of each tooth is adapted to shear the tissue captured by the needle-like tip portions as the inner window passes the cutting edges of the outer sleeve window.

In a first example, the present disclosure includes surgical instruments for resecting tissue. For example, such a device can include a shaft extending about a longitudinal axis to a working end, the shaft comprising an outer sleeve and an inner sleeve arranged coaxially, wherein the inner sleeve is rotatable relative to the outer sleeve; a plurality of cutting edges located at a distal portion of the inner sleeve; a primary window located in a superior side of the outer sleeve; a distal window in a distal tip of the outer sleeve; and the outer sleeve further including a bridge portion intermediate to the primary window and to the distal window.

In another variation, the surgical instrument can have a primary window that includes a first lateral side circumferentially spaced from a second lateral side where the bridge portion extends the first lateral side and the second lateral side in a transverse plane that is between 0 degrees and 45 degrees from being orthogonal to the longitudinal axis.

Variations of the device include the distal window being disposed at least partially in a rounded distal tip of the working end. Furthermore, additional variations of the device include the plurality of cutting edges of the inner sleeve that are exposed in both the primary window and the distal window during rotation of the inner sleeve.

Variations of the devices can include the plurality of cutting edges of the inner sleeve comprised on a first lateral side circumferentially spaced from a second lateral side of an inner sleeve window. The cutting edges described herein can further comprise burr edges.

The devices disclosed herein can also include a secondary window in an inferior side of the outer sleeve. In some variations, a wall portion of the outer sleeve is intermediate to the secondary window and the distal window.

A width of the primary window can extend over a radial angle greater than 120 degrees over an axial length thereof, and a width of the secondary window can extend over a radial angle less than 60 degrees over the axial length thereof.

In another variation, a wall portion of the outer sleeve intermediate to the secondary window and the distal window has a dimension of at least 0.5 mm about a tangent to a wall surface. Furthermore, the bridge portion of the outer sleeve that is intermediate to the primary window and the distal window can have an axial dimension across at least 0.5 mm about a tangent to a wall surface. A ratio of an area of the distal window to an area of the primary window can range from 0.1:1 to 0.8:1.

Another variation of a surgical instrument for resecting tissue, can include an elongated shaft extending about a longitudinal axis comprising an inner sleeve coaxial with an outer sleeve, wherein the inner sleeve is rotatable in the outer sleeve; wherein the inner sleeve has an inner cutting window in a distal end thereof; and wherein the outer sleeve has a first window, a second window and a third window and a first bridge element intermediate to the first window and the second window, and a second bridge element intermediate to the second window and a third window.

Other aspects in accordance with the present invention relate to features of the outer sleeve in its distal cutting window which will be described further below.

BRIEF DESCRIPTION OF THE DRAWINGS

FIGS. 10A-10D are schematic cross-sectional views of the working end of FIGS. 1-8 in a method of use wherein the teeth perform the two functions of first piercing and gripping hard tissue and then shearing off a tissue chip for aspiration away from the treatment site, wherein FIG. 10A shows the needle-like tip rotating toward hard tissue engaged by the windows.

FIG. 10B shows further rotation of the inner sleeve following the position of FIG. 10A, where the needle-like tip pierces into the hard tissue.

FIG. 10C shows further rotation of the inner sleeve following the position of FIG. 10B, where the needle-like tip continues to pierce and grip the hard tissue with the shoulder cutting edges approaching the outer sleeve window edges.

FIG. 10D shows further rotation of the inner sleeve where the shoulder cutting edges pass the outer sleeve window edges to thereby shear off a tissue chip.

FIG. 15A shows the inner sleeve of the working end of FIGS. 13A and 14 removed from the outer sleeve.

FIG. 15B shows the outer sleeve of the working end of FIGS. 13A and 14

DETAILED DESCRIPTION

Surgical probes of the present disclosure may be utilized in various types of surgeries, including but not limited to gynecology procedures such a myomectomies and polypectomies, ENT procedures, arthroscopies, spine surgeries, tumor resection procedures, and the like.

Figure 1:
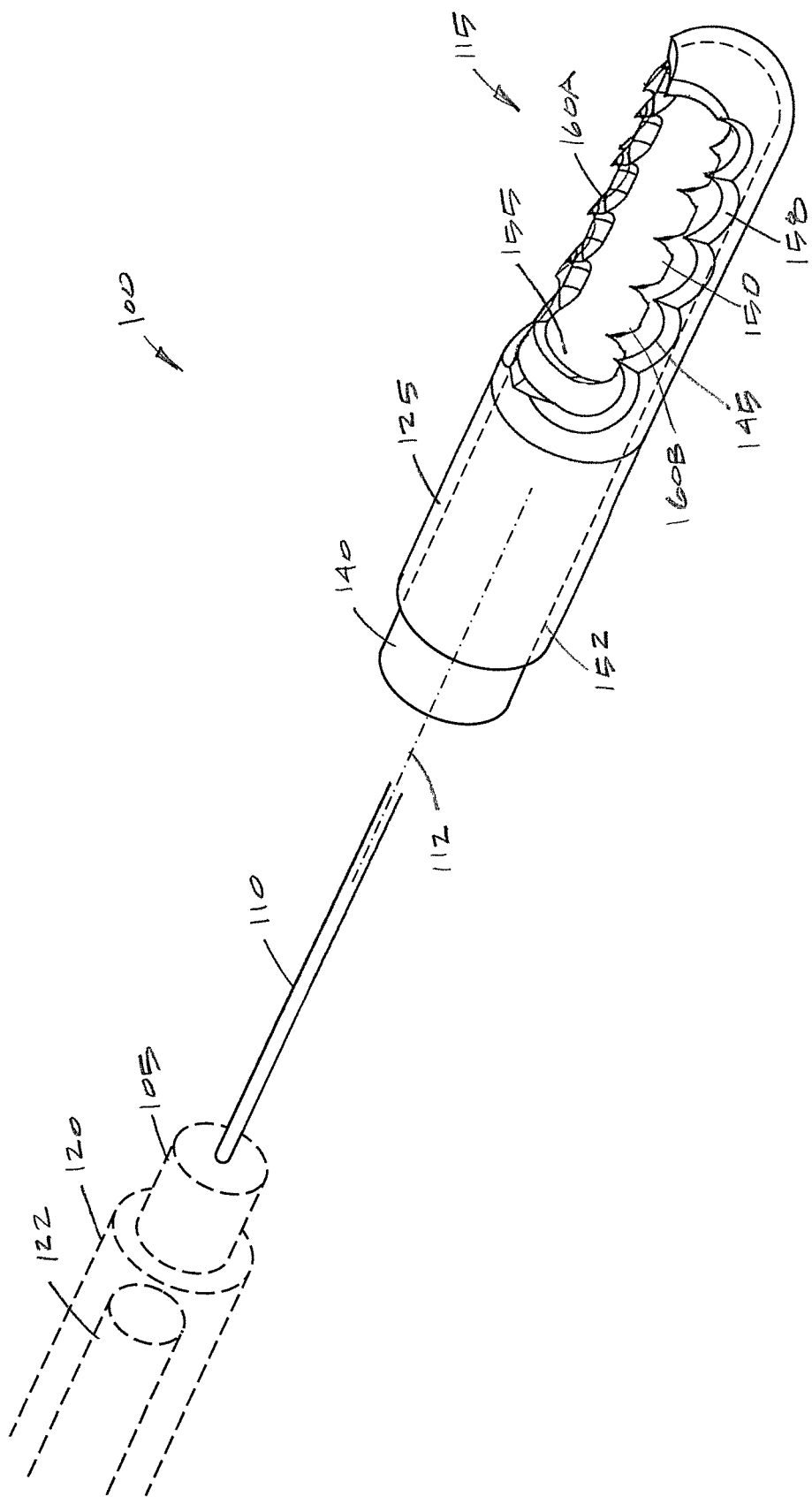
FIG. 1 is a perspective view of a surgical cutting device or resecting probe that is adapted for resecting and removing tissue from a patient's, wherein an elongate shaft portion of the probe includes a windowed outer sleeve and a rotatable windowed inner sleeve with sharp teeth for sequentially piercing and then shearing tissue when rotated or rotationally oscillated.

A surgical cutting probe 100 is shown in FIG. 1. The cutting probe 100 includes a proximal hub 105 coupled to an elongate shaft 110 extending about longitudinal axis 112 to a distal working end 115. The hub 105 can be detachably coupled to a handpiece 120 that carries a motor drive 122 (phantom view), as is known in the art.

The probe 100 and its shaft 110 include coaxial outer and inner sleeves 125 and 140, respectively, wherein the inner sleeve 140 is rotatable by the motor drive 122. The inner sleeve 140 includes a proximal inner hub member (not shown) that rotates within the proximal hub 105, as is known in the art. The outer sleeve 125 has a distal cutting window 145 in a superior surface 146 thereof. The inner sleeve 140 has a cooperating distal inner cutting window 150, which rotates within the bore 152 of the outer sleeve 125.

The handpiece 120 is adapted for driving the rotational movement of the inner sleeve 125 and the inner cutting window 150. The handpiece 120 also is configured with an aspiration channel that couples to the aspiration passageway or bore 155 in the inner sleeve 140 for extracting fluids and tissue chips from a resection site in a patient's body. Thus, the inner cutting window 150 of inner sleeve 140 functions as a fluid outflow port communicating with the inner sleeve bore 155 that is coupled through tubing (not shown) to a remote negative pressure source.

Optionally, a fluid inflow path can be provided to the proximal hub 105 of the probe 100 to deliver fluid to the space between the inner and outer sleeves, 125 and 140, so that the outer sleeve window 145 of the outer sleeve 125 functions as a fluid inflow port. Such a fluid inflow path, in turn, would be is adapted for connection to inflow tubing (not shown) that is coupled to a pressurized fluid source.

Figure 2A:
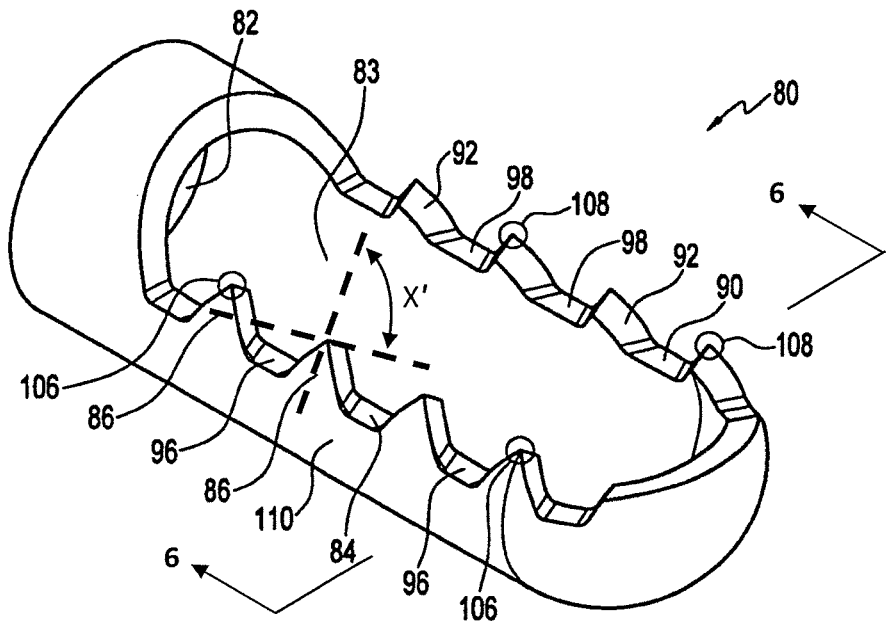
FIG. 2A is a perspective view of a prior art inner sleeve cutting window of a tubular cutter which illustrates typical cutting edge teeth that cannot pierce into hard tissues 5th.
Figure 2B:
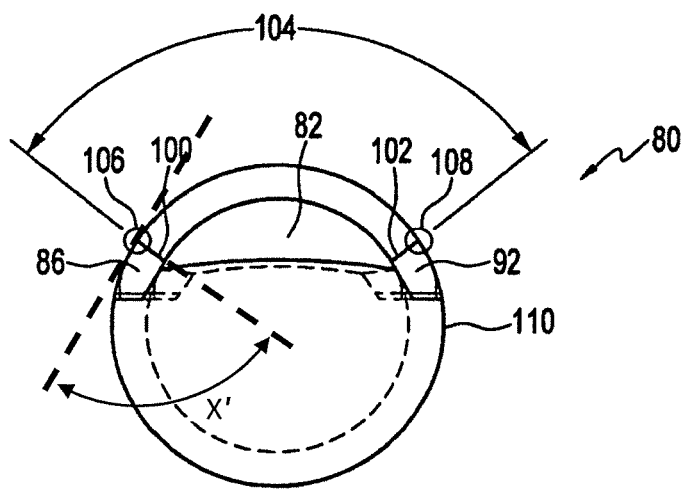
FIG. 2B is a cross-sectional view of the cutting member of FIG. 2A taken along line 2B-2B of FIG. 2A.
Figure 3:
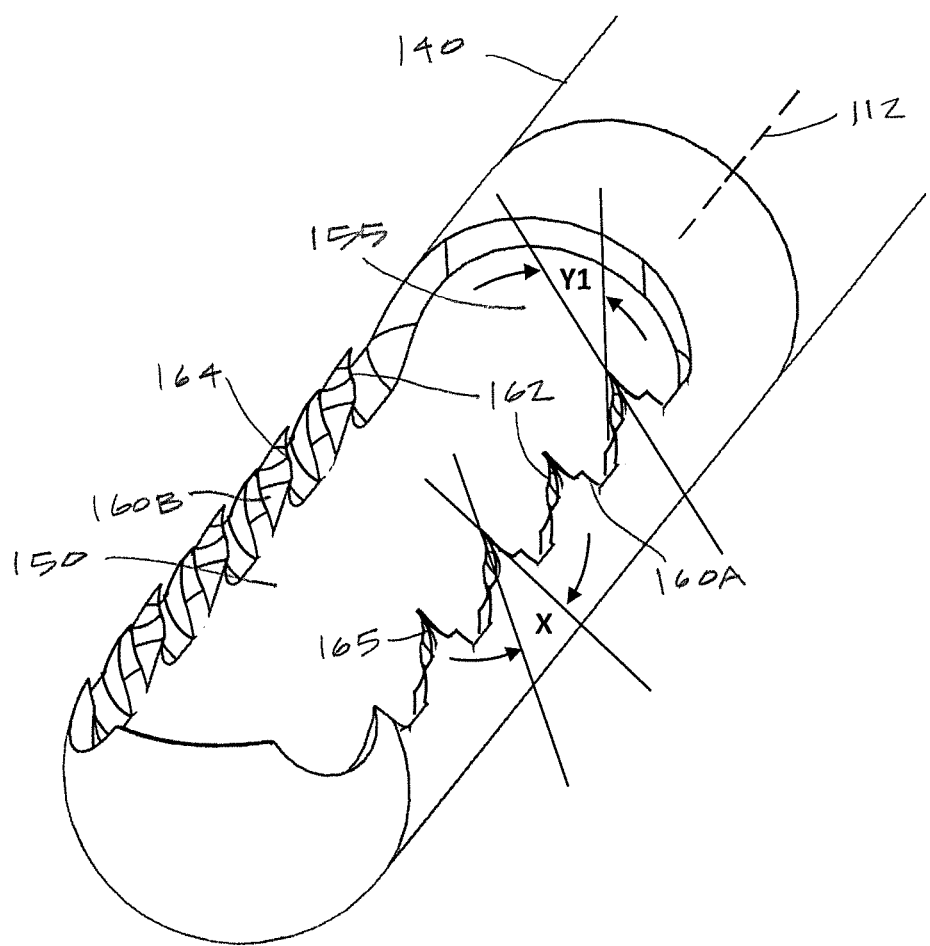
FIG. 3 is a perspective view of the cutting edges of the inner sleeve window wherein the teeth have a first functional portion consisting of a very sharp needle-like tip for penetrating tissue and shoulder or lateral portions that extend axially relative to the axis of the probe.

After understanding the general principles of probe 100, several particular features of the working end of the invention are shown in greater detail in FIGS. 3, in 4 and 5, which can be compared to prior art working end shown in FIGS. 2A and 2B. The prior art illustrations of FIGS. 2A and 2B are reproductions of FIGS. 19 and 20 from European Patent Specification EP1698290B1 filed Feb. 3, 2006, by Van Wyk, also published U.S. patent application No. 20060196038.

In FIG. 3, the distal end 156 of inner sleeve 140 is shown separated from the outer sleeve 125. In general terms, the inner sleeve 140 is rotatably disposed within the bore 152 in the outer sleeve 125 such that the inner sleeve cutting window 150 rotates to cut or shear tissue captured against the cutting edges 158 of the outer sleeve cutting window 145 (see FIG. 1).

Figure 5:
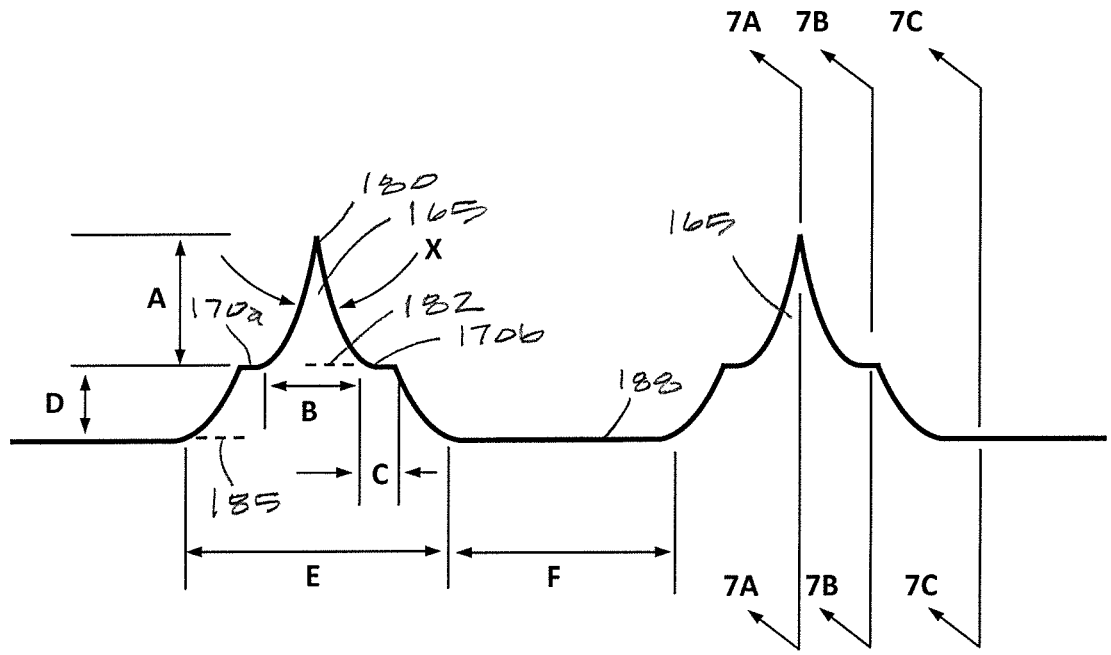
FIG. 5 is an enlarged schematic view of the teeth of FIG. 4, showing the dimensions of various aspects of the teeth and the cutting edges.
Figure 4:
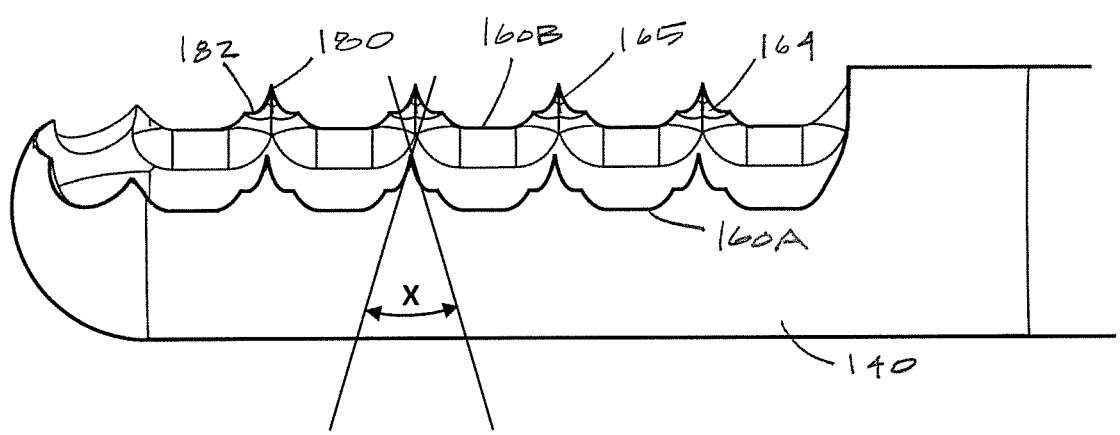
FIG. 4 is a side elevation view of the distal portion of the inner sleeve of FIG. 3 showing the inner cutting window.

As it can be seen in FIG. 3, the inner sleeve cutting window 150 has circumferentially spaced-apart first and second cutting edges 160A and 160B with a plurality of teeth 162 in each cutting edge with cutting faces 164 beveled inwardly. One variation of an improved device relates to the shape of the teeth 162, which are configured with elements for performing two different functions. First, the teeth 162 include very sharp needle-like tip portions 165 for piercing and gripping hard tissue during rotation. Second, the teeth 162 include sharp lateral edges 170a and 170b that function as tissue-shearing elements to cut and shear tissue that is engaged and gripped by the teeth as the inner sleeve window 150 rotates towards a cooperating opposing cutting edge 158 of the outer sleeve cutting window 145 during use. In FIGS. 3, 4, and 5, it can be seen that the teeth 162, when viewed in a direction parallel to the axis 112, define a base portion 172 extending radially to the shoulder or lateral portions 170a and 170b and thereafter radially to a needle-like tip portion 165 with vertex 180 configured for piercing and gripping tissue, but not for shearing off tissue chips.

Referring to FIGS. 4 and 5, the needle-like tip portions 165 of the teeth 162, when viewed in a direction parallel to the axis 112, extend upwardly at a sharp angle so that the tip or vertex 180 is exceptionally sharp for piercing and penetrating tissue. In one variation, the included angle X of the tip portion 165 defines an acute angle of less than 44O, less than 42O, or less than 40O, as best shown in FIGS. 4 and 5. The height A of the teeth 162 from its tip or the vertex 180 to the tip base 182 is at least 0.015" and often greater than 0.020". The axial dimension B of the tip base 182 is between 0.015" and 0.040". Stated another way, referring to FIG. 6, the height A of a needle-like tip portion 165 can be defined by its radial angle RA1, which ranges from 15O to 20O or more (see FIG. 6). In one variation shown in FIG. 6, the outer diameter D1 is 0.133" and the inner diameter D2 is 0.110" with a wall thickness W of 0.012" (not limiting).

Figure 7A:
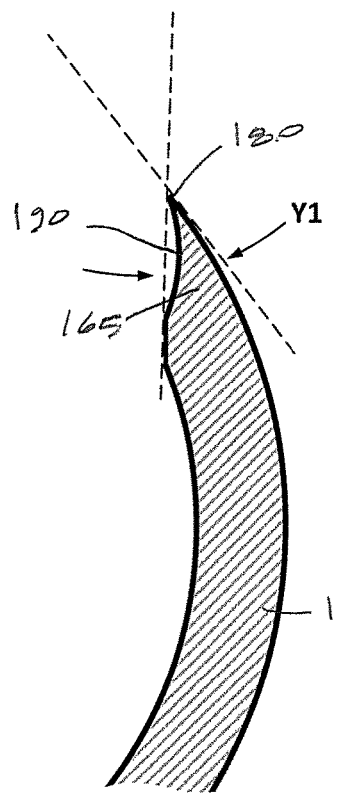
FIG. 7A is an enlarged cross-sectional view of the tooth of FIG. 5 taken along line 7A-7A of FIG. 5 showing the surface angles of the needle-like tip portion, which is defined by a tangent at the outer surface of the tooth vertex and a plane extending across an inner face of the tooth.

FIG. 7A shows the needle-like tip portion 165 of a tooth 162 from a different direction showing its sharpness. In FIG. 7A, it can be seen that the needle tip portion 165, when viewed in cross-section from a direction transverse to the axis 112, defines an acute angle Y1 of less than 44°, less than 42°, or less than 40°.

In contrast, typical prior art teeth 92 of an inner sleeve working end 80 of a tubular cutter are shown in FIGS. 2A and 2B, where the teeth are not sharp enough to pierce into tissue. As can be seen in FIGS. 2A and 2B, the included angle X' of the tip 106 of the teeth is 92 close to 90°.

Figure 6:
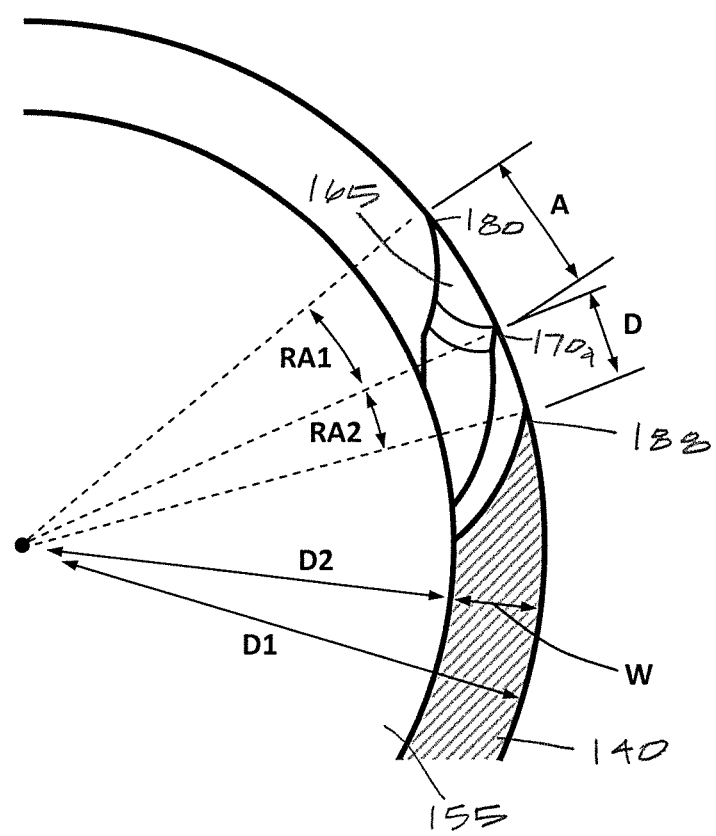
FIG. 6 is a sectional view of the cutting member of FIG. 4 taken along line 6-6 of FIG. 4, showing the radial angle over which, the needle-like teeth extend as well as the radial angle of other elements of the cutting edge.
Figure 7B:
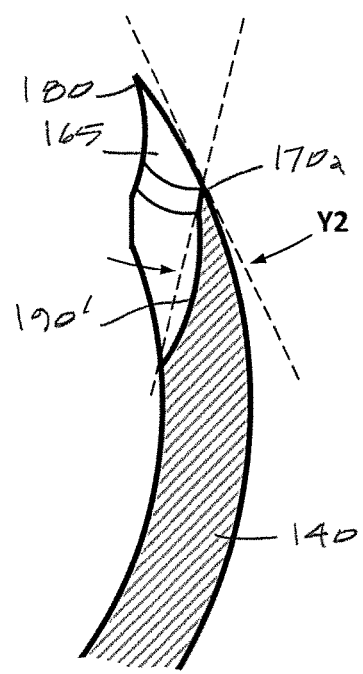
FIG. 7B is similar to that of FIG. 7A but showing a cross-sectional view of the cutting edge of the lateral portion of the cutting edge and tooth of FIG. 5 taken along line 7B-7B of FIG. 5

Referring again to FIGS. 4 and 5, the shoulder or lateral portions 170a, 170b of teeth 162 are also very sharp. In one variation, as shown in FIG. 7B, the acute angle Y2 of the cutting edge of a tooth lateral portion is less than 44O, less than 42O, or less than 40O. Referring back to FIG. 5, the lateral portions 170a, 170b have cutting edges that extend in an axial direction and have a dimension C of at least 0.005" on either or both sides of the needle-like tip portion 165. In some variations, the generally axial dimension C is between 0.010" and 0.040". In one variation, the height D of a tooth from the lateral portions 170a, 170b to the base 185 of the tooth 162 is typically greater than 0.05" and often greater than 0.010" (see FIG. 5). Stated another way, referring to FIG. 6, the height D of a tooth 162 from the base 185 to the lateral portions 170, 170b can be defined by its radial angle RA2, which ranges from 15O to 25O. The axial dimension E of the base 185 of the teeth is between 0.010" and 0.040".

Figure 7C:
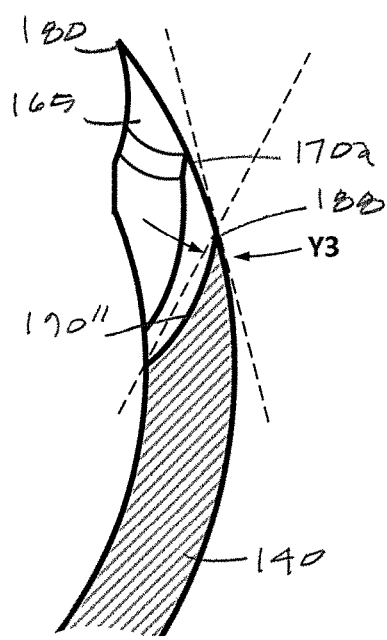
FIG. 7C is similar to that of FIGS. 7A-7B but showing a cross-sectional view of the sharp edge of the base cutting edge that extends between the teeth of the cutting edge of the inner sleeve window taken along line 7C-7C of FIG. 5.

Still referring to FIGS. 4 and 5, the cutting edges 160A, 160B of window 150 are also configured with a base cutting edge 188 that extends axially between the shoulder or lateral portions 170a, 170b of the teeth 162. The base cutting edges are also very sharp, and in one variation, have an acute angle Y3 of less than 44°, less than 42°, or less than 40°, as can be seen in FIGS. 6 and 7C. The base cutting edge 188 extends in an axial direction a dimension F which can range from 0.020".

In some variations, as can be seen in FIGS. 6, 7A, 7B, and 7C, the sharp edges of needle-like tip portion 165, the lateral portions 170a, 170b, and the base portion 185 have hollow ground faces 190, 190' and 190' which enhance the sharpness of such edges for tissue gripping and for the enhancing the cutting ability of such edges (see FIGS. 7A-7C). In some variations, such hollow ground faces of the cutting edges can be machined with a ball-end mill to provide a selected radius of the hollow ground edge. In other variations, the machining process can use an end-mill that creates a parabolic hollow ground shape in the face of the cutting edges.

Figure 8:
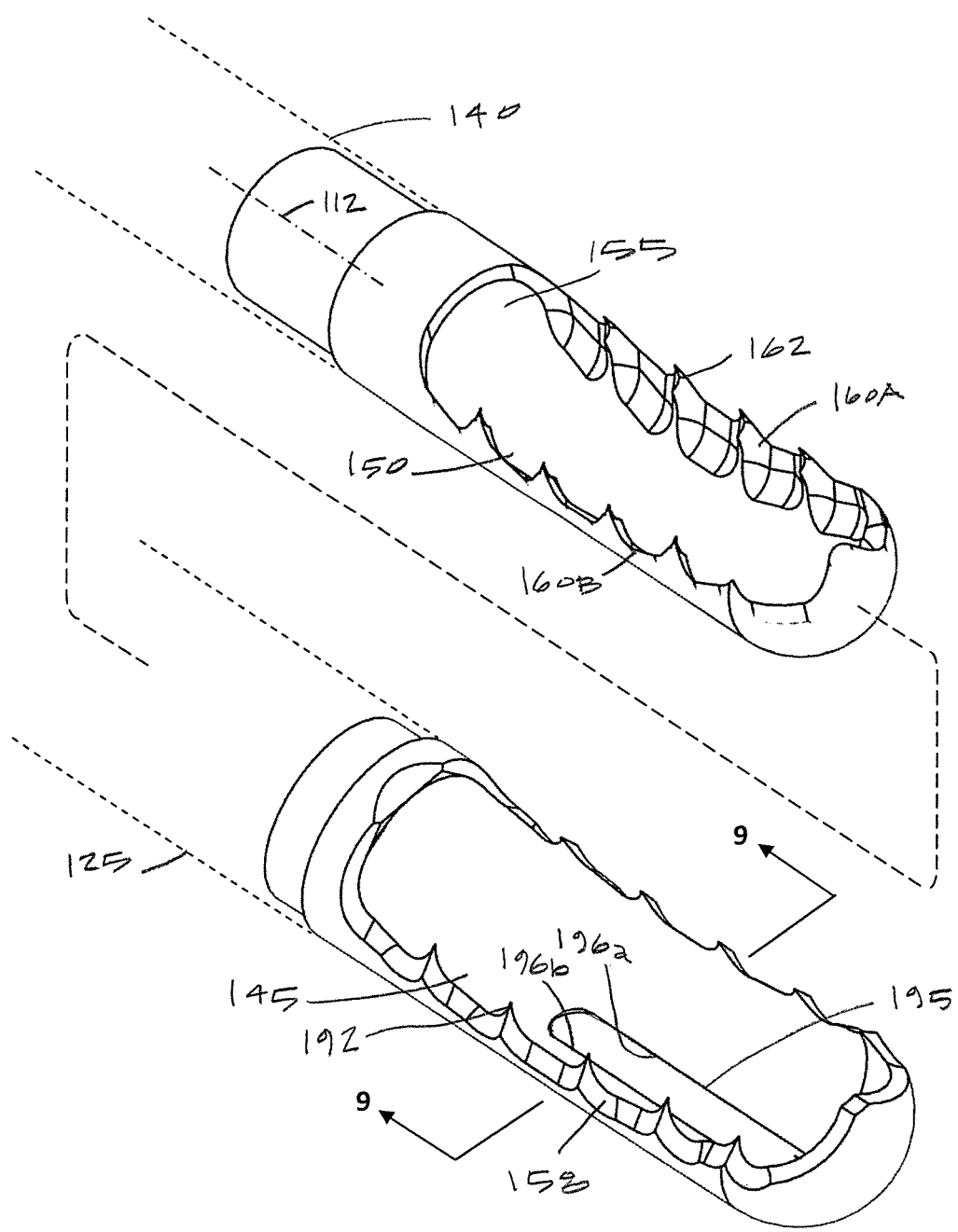
FIG. 8 is an exploded view of the distal ends of both an inner sleeve and an outer sleeve showing the teeth and features of the cutting edge of the outer sleeve window together with a secondary window in the outer sleeve opposing the primary cutting window.

Now turning to FIG. 8, the distal ends of an outer sleeve 125 and inner sleeve 140 are shown in an exploded view to illustrate the configuration of teeth 192 on the cutting edges 158 of the outer sleeve cutting window 145. In FIG. 8, the outer sleeve 125 has teeth 192 that are aligned with teeth 162 of the inner sleeve window 150, which has been found to be effective for engaging and shearing tissue. The teeth 192 in the outer cutting edge 158 of the outer window 145 again have very sharp angles that are beveled outwardly with such angles being less than 50° and often less than 45°.

As also can be seen in FIG. 8, one variation of the outer sleeve 125 includes a secondary window 195 in an inferior surface 194 at the distal end of the sleeve opposing the primary cutting window 145. In general, such a secondary window 195 is useful for maintaining fluid flows through the probe during use since at least a portion of either window 145 or 195 will be open to the window 150 and aspiration passageway or bore 155 of the inner sleeve 140.

Figure 9:
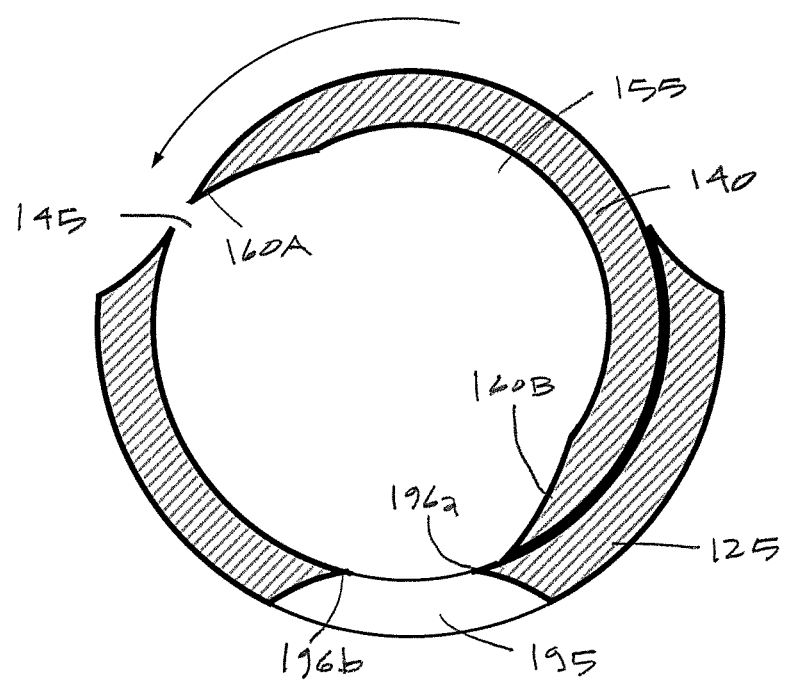
FIG. 9 is a cross-sectional view of the outer sleeve window and secondary window of FIG. 8 taken along line 9-9 of FIG. 8 and further shows the rotation of the inner sleeve.

In one variation, as shown in FIGS. 8 and 9, the secondary window 195 can be configured with lateral, sharp cutting edges 196a and 196b for engaging and shearing tissue when cooperating with the rotating inner sleeve 140 and cutting edges 160A and 160B. In other words, if the physician wishes to resect tissue less aggressively than is possible with the primary cutting window 145 cooperating with the rotating inner sleeve 125, the physician may engage the targeted tissue in the secondary window 195 and rotate the inner sleeve 140, which will resect far smaller amounts of tissue in a very precise manner. FIG. 9 shows a cross-sectional view of the secondary cutting window 195 with sharp edges 196a and 196b. The sharp edges 196a and 196b of the secondary window 195 also may be serrated or otherwise configured with teeth similar to those described previously.

Figure 10A:
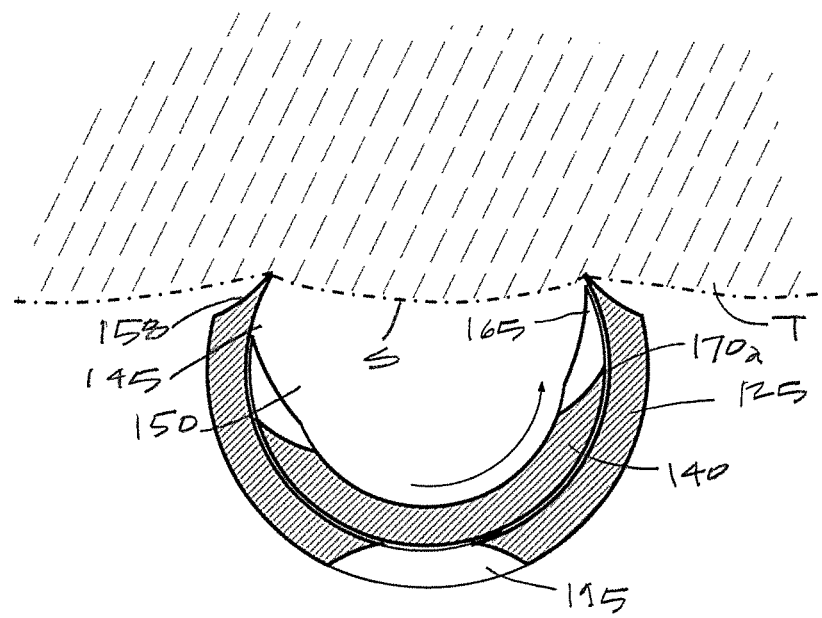
Figure 10B:
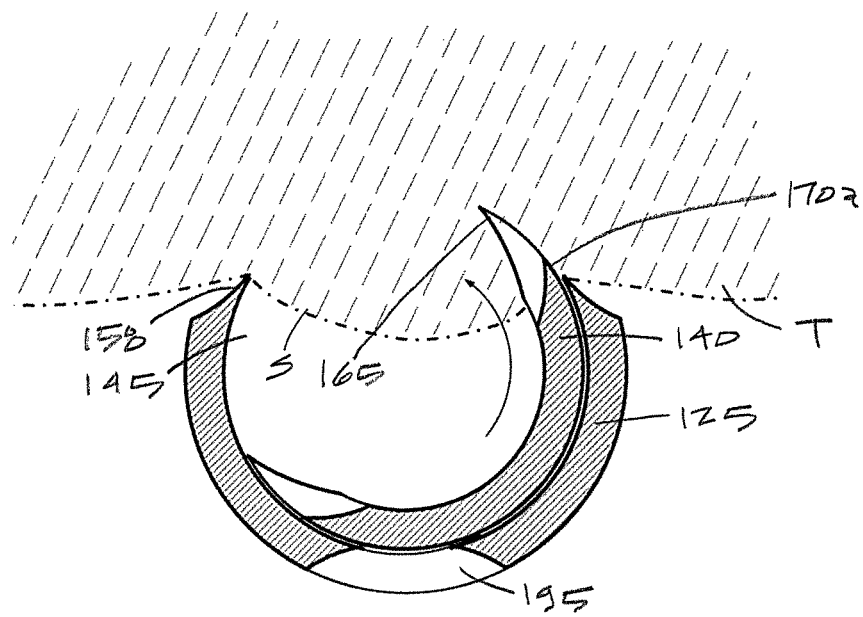
Figure 10C:
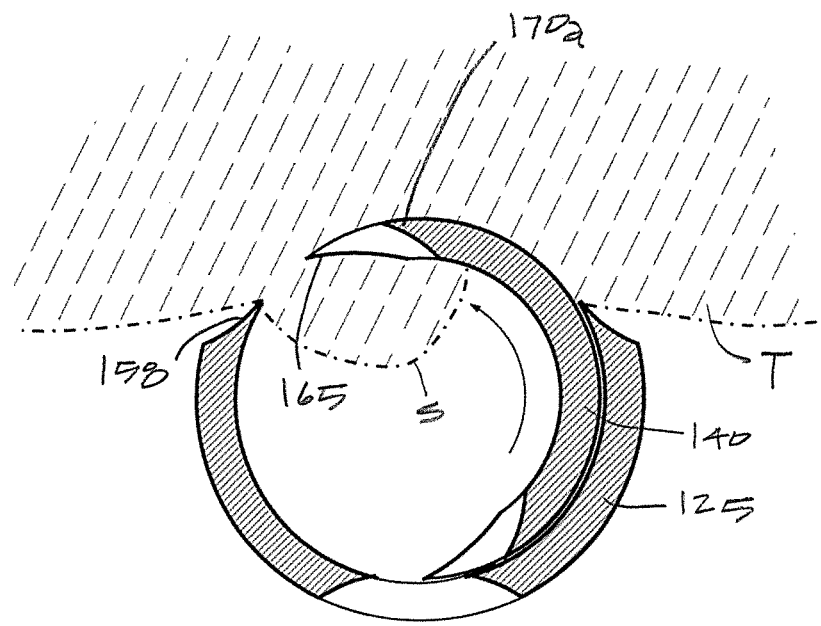
Figure 10D:
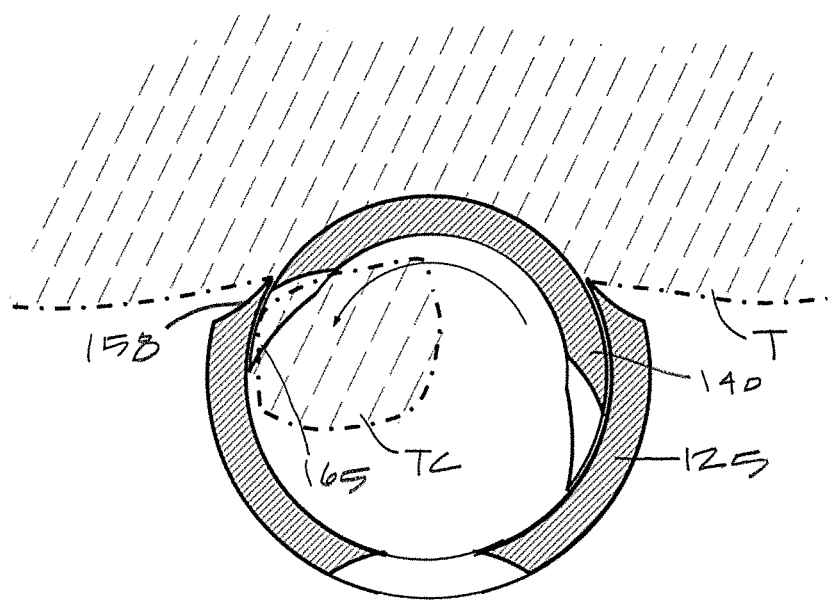
Figure 11A:
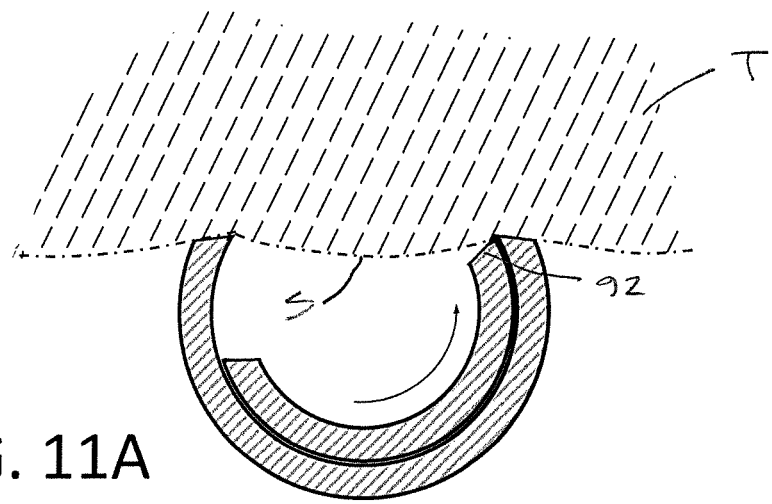
FIGS. 11A-11B are cross-sectional views similar to those of FIGS. 11A-11B but showing the exemplary prior cutter of FIGS. 2A-2B without exceptionally sharp needle-like teeth is ineffective at resecting hard tissue.
Figure 11B:
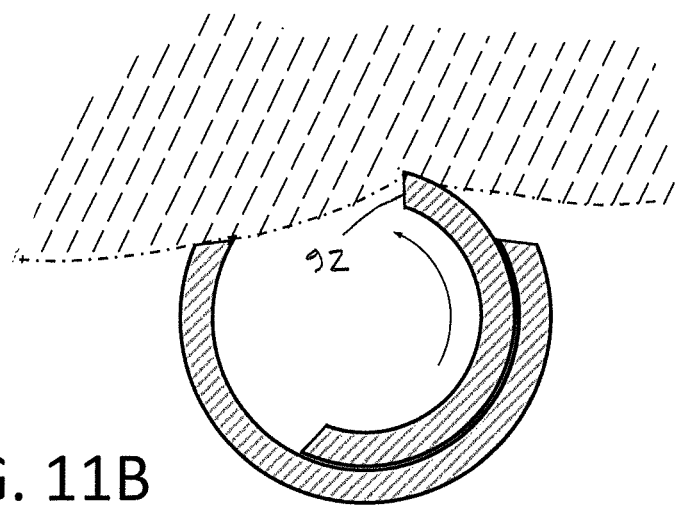

FIGS. 10A-10D provide illustrations of how the inner sleeve teeth 162 (FIG. 3) are adapted to perform two functions sequentially, wherein the needle-like tip portion 165 firstly pierces and grips tissue, and secondly, the lateral cutting edges 170a, 170b function to shear off a tissue chip as such edge rotate past the cutting edges 158 of the outer sleeve 125. In FIG. 10, it can be seen that the outer sleeve 125 and its window 145 are oriented with the inner sleeve 140 and inner window 150 in a window-open position where the leading edge 160A of the inner sleeve 140 is about to contact tissue T. In this case, it can be seen that the tissue T is depicted as a hard form or tissue which is not suctioned very far through the two windows 145, 150 into passageway or bore 155. As an example, such hard tissue may be a calcified fibroid in a gynecology procedure or a tendon in an arthroscopic procedure. In FIG. 10B, it can be seen that the needle-like tip 165 with vertex 180 is able to penetrate into the tissue T as the inner sleeve 140 is rotated. In FIG. 10C, it can be seen that the inner sleeve 140 is rotated further with the needle-like tip 165 still piercing and gripping tissue as the vertex 180 approaches the opposing cutting edge 158 of outer sleeve 125. FIG. 10D illustrates the pierced and gripped tissue T as it rotates further until the lateral cutting edges 170a, 170b of inner sleeve 140 have passed the cutting edge 158 of the outer sleeve 125 to shear off tissue chip TC in the extraction passageway 155 for aspiration away from the treatment site. In contrast, FIG. 11A-11B are schematic views of a typical prior art cutting assembly of the type shown in FIG. 2B wherein the rotation of the cutter does not cut hard tissue. In FIG. 11A, it can be seen that teeth and cutting edge 92, without an exceptionally sharp tip, will have the tendency to simply bump into and scrape across the surface S of hard tissue T rather than piercing into and gripping such tissue.

Figure 12A:
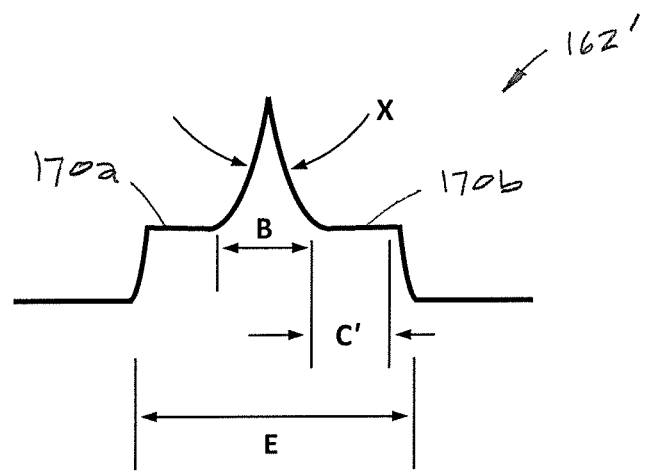
FIG. 12A is an illustration of a tooth of cutting edge similar to that of FIGS. 4 and 5 except that the cutting edge of the shoulder or lateral portion is elongated axially compared to the variation of FIG. 4.
Figure 12B:
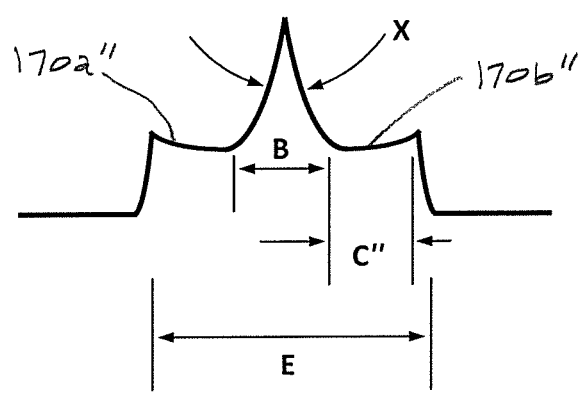
FIG. 12B is a schematic view of another tooth configuration of an inner sleeve showing a sharp needle tip with secondary edge portions that are non-linear and extend in a hook shape.

FIGS. 12A and 12B illustrate other variations of teeth 162' similar to that of FIGS. 4 through 6, where the shoulder or lateral portion 170a' and 170b' is more prominent. In FIG. 12A, it can be seen that the cutting edge of the lateral portion 170a', 170b' extend axially parallel to the axis of the probe 100 with more elongated cutting edges than the previous variation of FIGS. 4 and 5. In FIG. 12B, the cutting edges on the lateral portions 170a", 170b" are shown with a curvature which is also within the scope of the invention. In all other respects, the cutting edges of FIGS. 12A and 12B are similar to those of FIGS. 7A-7C with respect to the sharp angles of the cutting faces relative to the outside diameter of the inner sleeve 140.

Figure 13B:
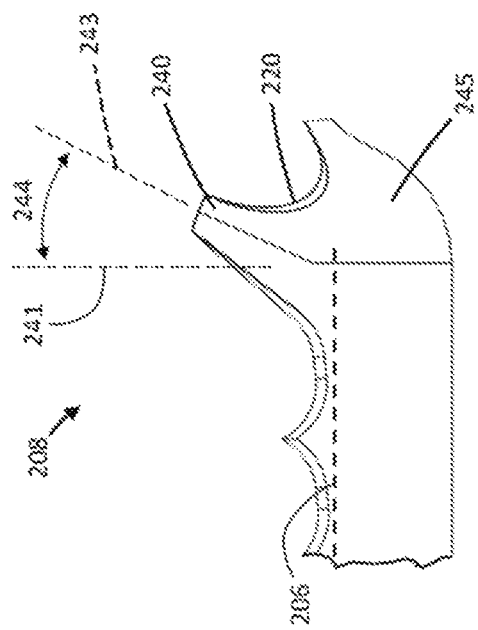
FIG. 13B illustrates a partial view of a working end of a bridge portion that is not orthogonal to a longitudinal axis of the device.
Figure 13A:
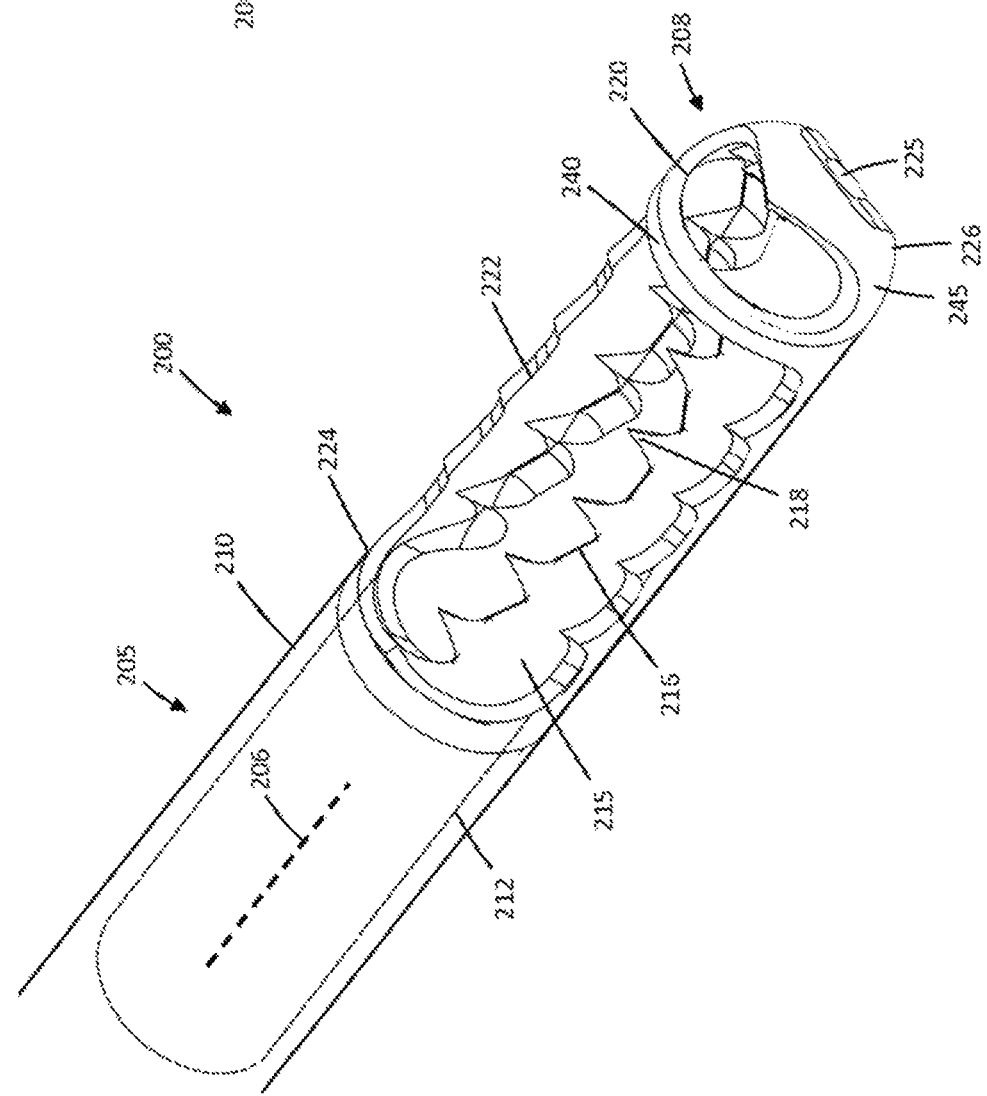
FIG. 13A is a perspective view of another working end with an inner sleeve that rotates in an outer sleeve configured with a primary cutting window in a superior surface of the outer sleeve, a secondary cutting window in an inferior surface of the outer sleeve, and a third cutting window at a distal tip of the outer sleeve.
Figure 14:
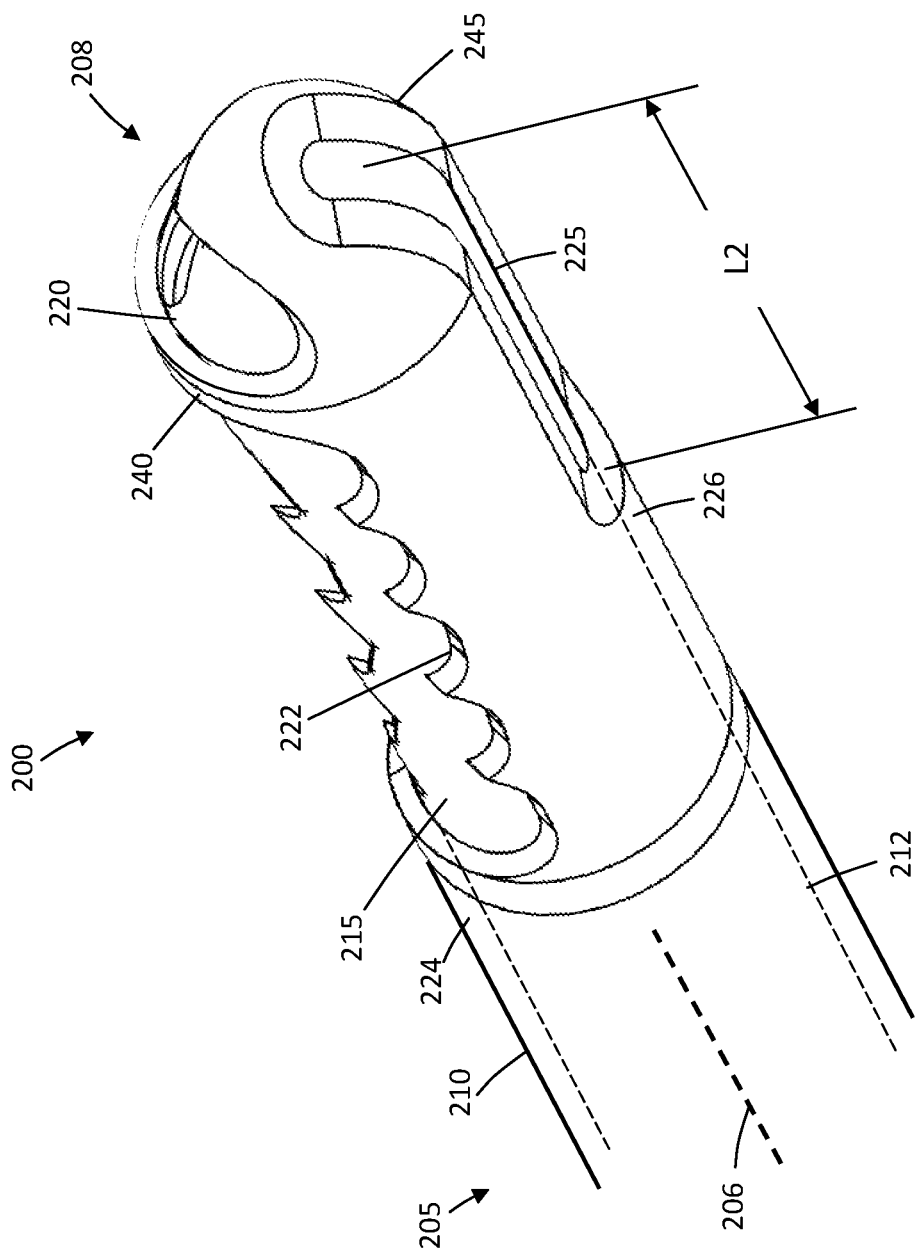
FIG. 14 is a perspective view of the working end of FIG. 13A from a different angle showing the configuration of the secondary cutting window in the inferior surface of the outer sleeve.

FIGS. 13A and 14 illustrate another variation of a probe working end 200 that is similar to that of FIGS. 1 and 8 with shaft 205 extending about a central longitudinal axis 206 to a distal probe tip 208, where the shaft 205 again has an outer sleeve 210 with a bore 212 therein that accommodates a motor-driven, rotating inner sleeve 215 having an inner cutting window 216 with sharp teeth 218. The working end 200 of FIGS. 13A and 14 differs from the previous variation of FIGS. 1 and 8 in that the outer sleeve 210 is configured with a distal tip cutting window 220 in addition to the primary or first cutting window 222 in a superior surface 224 of the outer sleeve 210. The working end 200 again has a secondary cutting window 225 in an inferior surface 226 of the outer sleeve 210. The previous variation shown in FIGS. 1 and 8 has only a primary cutting window 145 and a secondary cutting window 195, in superior and inferior surfaces 146, 194, respectively, of the outer sleeve. As described previously, such primary cutting windows (145, 222) are used for aggressive resection of targeted tissue where large tissue chips are removed, and the secondary cutting windows (195, 225) of FIGS. 8 and 13A are used for less aggressive tissue resection were very small tissue chips are removed from the targeted site.

FIG. 15A shows the inner sleeve 215 separated from the outer sleeve 210 (see FIG. 14). FIG. 15B shows the outer sleeve 210 separated from the inner sleeve 215. In FIGS. 13A and 15B, it can be seen that the primary cutting window 222 in the superior surface 224 of the outer sleeve 210 extends from a proximal end 232a to a distal end 232b bounded by a first bridge element or bridge portion 240 of the wall of outer sleeve 210 that extends circumferentially between the first and second lateral cutting edges 242a and 242b of the primary cutting window 222. Typically, the outer sleeve 210 has an outside diameter ranging between about 3 mm and 8 mm, and more typically 3.5 mm to 6 mm. The dimensions, angles, and ratios described below are representative of outer sleeves 210 having such diameters. The axial length L1 of the primary window 222 can range from approximately 2.0 mm to 20 mm (FIG. 15B). As can be seen in FIG. 14, the secondary cutting window 225 in the inferior surface 226 of the outer sleeve 210 has a narrower width than the primary cutting window 222. As also can be seen in FIG. 14, the secondary window 225 partially extends around the distal rounded tip 245 of the outer sleeve 210. The axial length L2 of the secondary window 225 can range from approximately 1.0 mm to 15 mm (FIG. 14) and is typically shorter than the axial length L1 of the primary window 222 (FIG. 15B). In a variation, the ratio of the axial length L2 to the axial length L1 of the respective windows, 225, 222 ranges from 0.2:1 to 0.9:1. In FIGS. 13A and 14, it can be seen that the bridge portion 240 extends between the circumferentially spaced-apart lateral sides of the primary and distal windows in a transverse plane that is orthogonal to the longitudinal axis 206. In such a variation, the bridge portion will extend in a 90-degree direction from the axis 206. In additional variations, as shown in FIG. 13B, a transverse centerline 243 of the bridge portion 240 can include any angle 244 of deviation from a transverse plane 241 that is orthogonal to the longitudinal axis 206. For example, such an angle 244 can vary as needed, e.g., from 00 to 450 from being orthogonal to the longitudinal axis 206.

Figure 16:
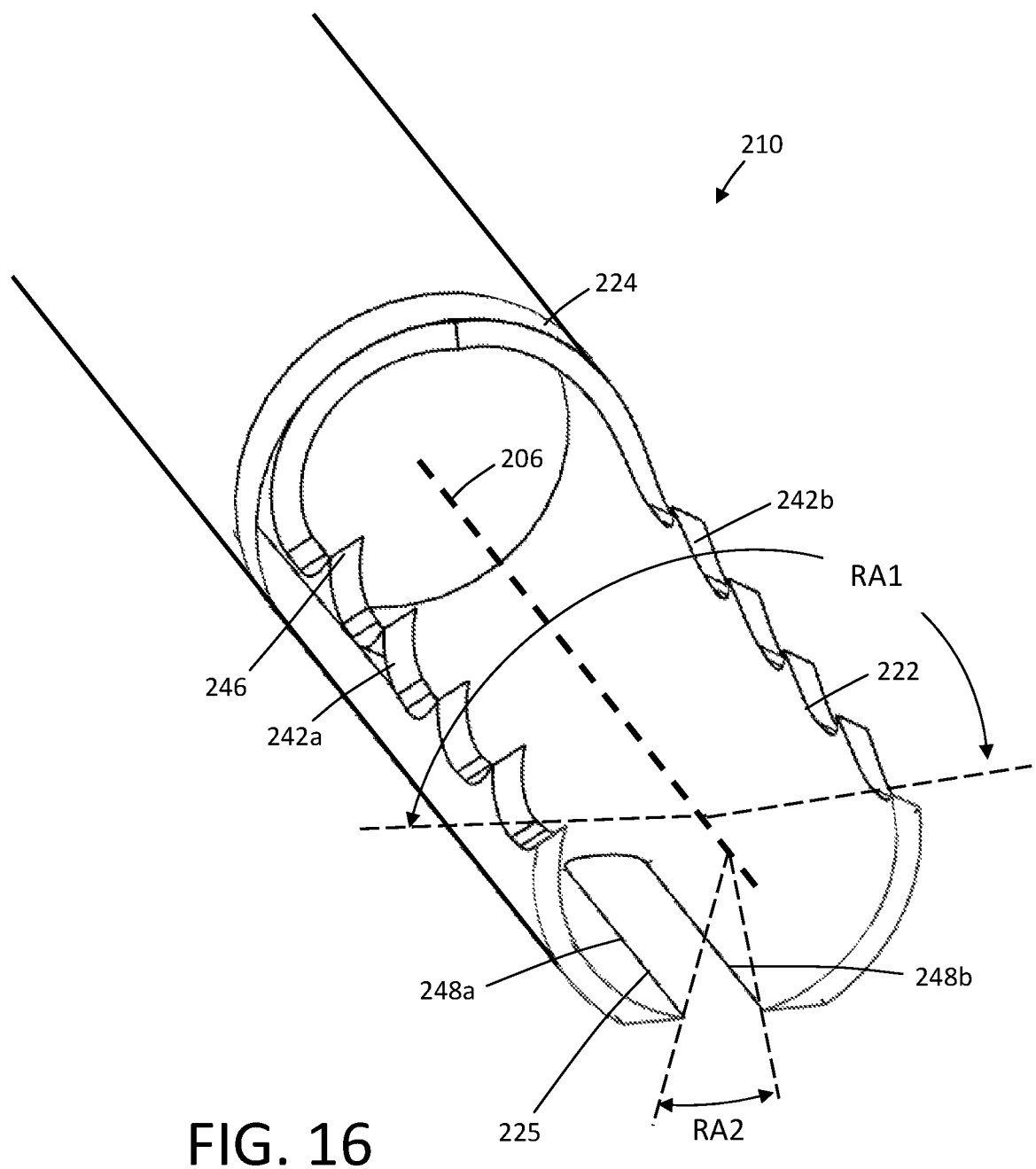
FIG. 16 is a transverse sectional view of the outer sleeve of FIG. 15B, showing the width dimensions of the primary and secondary cutting windows in the outer sleeve.

Now turning to FIG. 16, it can be seen that the primary cutting window 222 in outer sleeve 210 has sharp teeth 246 as described in the previous variation of FIGS. 1 and 8. Typically, the primary cutting window 222 has a width measured in a radial angle RA1 of between 150° and 180°. FIG. 16 also shows the width of the secondary cutting window 225 is small in comparison to the width of the primary cutting window 222. The secondary window is adapted for less aggressive tissue cutting, as described above. In one variation, the width of the secondary cutting window 225 extends over a radial angle RA2 of less than 60°, and in another variation is less than 30°. In typical variations, the ratio of the width (defined by radial angles RA2, RA1) of the respective windows 225, 222 ranges from 0.10:1 to 0.50:1. In the variations shown in FIGS. 14 to 18, the secondary window 225 is shown without teeth, but it should be appreciated that the lateral edges 248a and 248b of window 225 (FIG. 16) can be configured with teeth or serrations. When describing the width of the windows 222 and 225 in terms of radial angles RA1 and RA2, such radial angles can be measured at the notches between the teeth 246 or between non-serrated edges, as shown in FIG. 16.

In one variation, referring to FIG. 15B, the area of primary cutting window 222 can range between 5 mm2 and 50 mm2 and the area of the secondary cutting window can range from 2 mm2 to 20 mm2. In such variations, the ratio of the areas of the respective windows, 225, 222, ranges from 0.1:1 to 0.8:1.

Figure 17A:
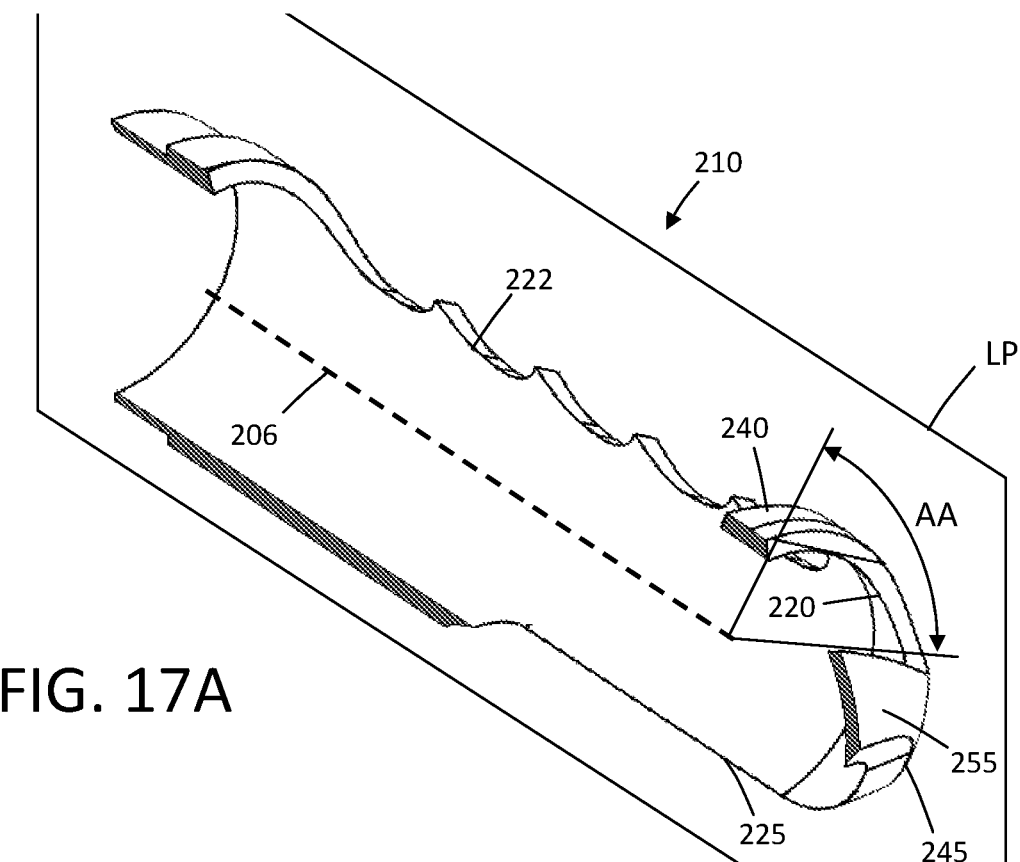
FIG. 17A is a longitudinal sectional view of the outer sleeve of FIG. 15B, showing the axial dimensions of the distal cutting window.
Figure 17B:
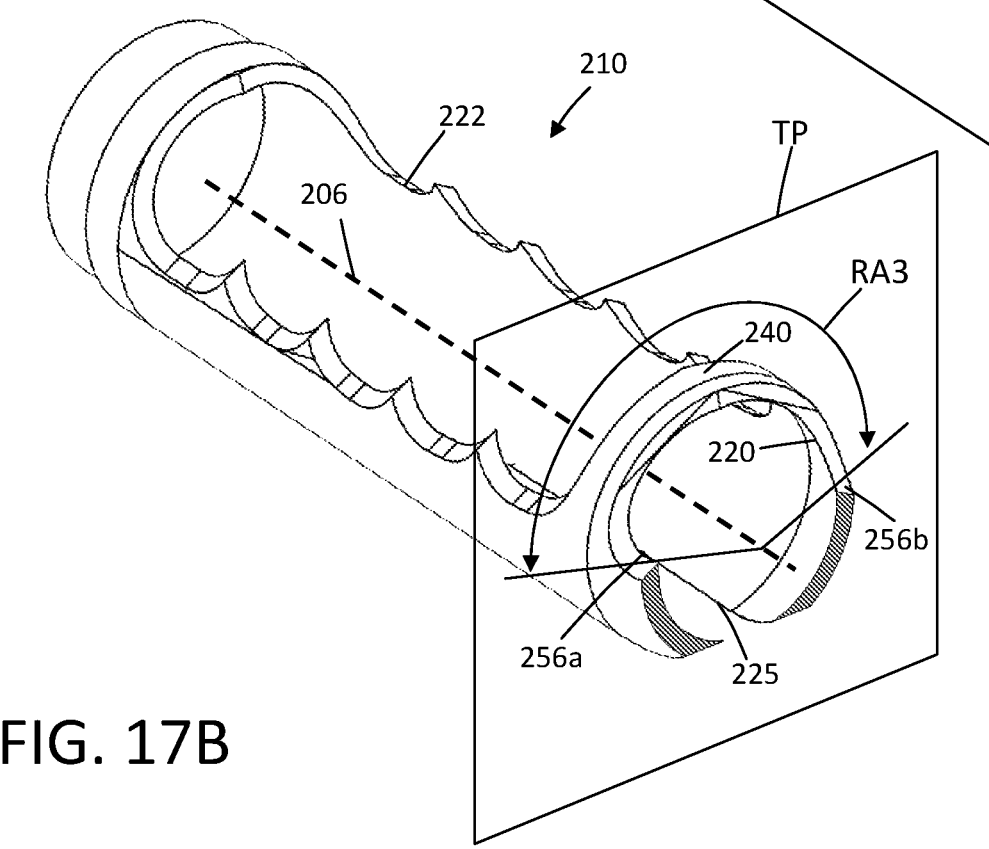
FIG. 17B is a transverse sectional view of the outer sleeve of FIG. 15B, showing the transverse dimensions of the distal cutting window.

Now turning to FIGS. 15B, 17A, and 17B, it can be seen that the third or distal cutting window 220 in the outer sleeve 210 is disposed in the rounded distal tip 245 of the outer sleeve 210 and is adapted for cutting tissue with the distal tip 208 of the working end 200 (FIG. 13A). The outer sleeve 210 is configured with a second bridging element or wall portion 255 of outer sleeve 210 intermediate the secondary cutting window 225, and the distal tip cutting window 220. FIGS. 17A and 17B illustrate the dimensions of the distal cutting window 220. In FIG. 17A, the axial dimension of distal window 220 can be described as an angle AA within longitudinal plane LP at the centerline or axis 206 of the outer sleeve 210. In one variation, the angular dimension AA is greater than 30°, where such an angle AA is measured outwardly from a point on the central longitudinal axis 206 that has a centerline drawn perpendicular to a tangent of the curved surface of the rounded tip 245 of the outer sleeve 210 in which the distal window 220 is disposed. The dimension of the window 220, when measured at a tangent to the center of the window can range from 1 mm to 5 mm or the diameter of the bore 212 in the outer sleeve. In a variation, the area of the distal cutting window 220 is between 2 mm2 and 12 mm2. In one variation, the ratio of the areas of the respective windows, 220 and 222, ranges from 0.05:1 to 0.5:1.

In FIG. 17B, the width of the distal window 220 can be measured in a radial angle RA3 relative to the central axis 206 of the outer sleeve 210 in a transverse plane TP. In typical variations, the radial angle RA3 ranges from 90° to 200°, and most often is between 150° and 180°. The lateral edges 256a and 256b of the distal window 220 are short and are shown without teeth. However, it should be appreciated that such lateral edges 256a and 256b can be configured with one or more teeth in each such lateral edge.

Figure 18:
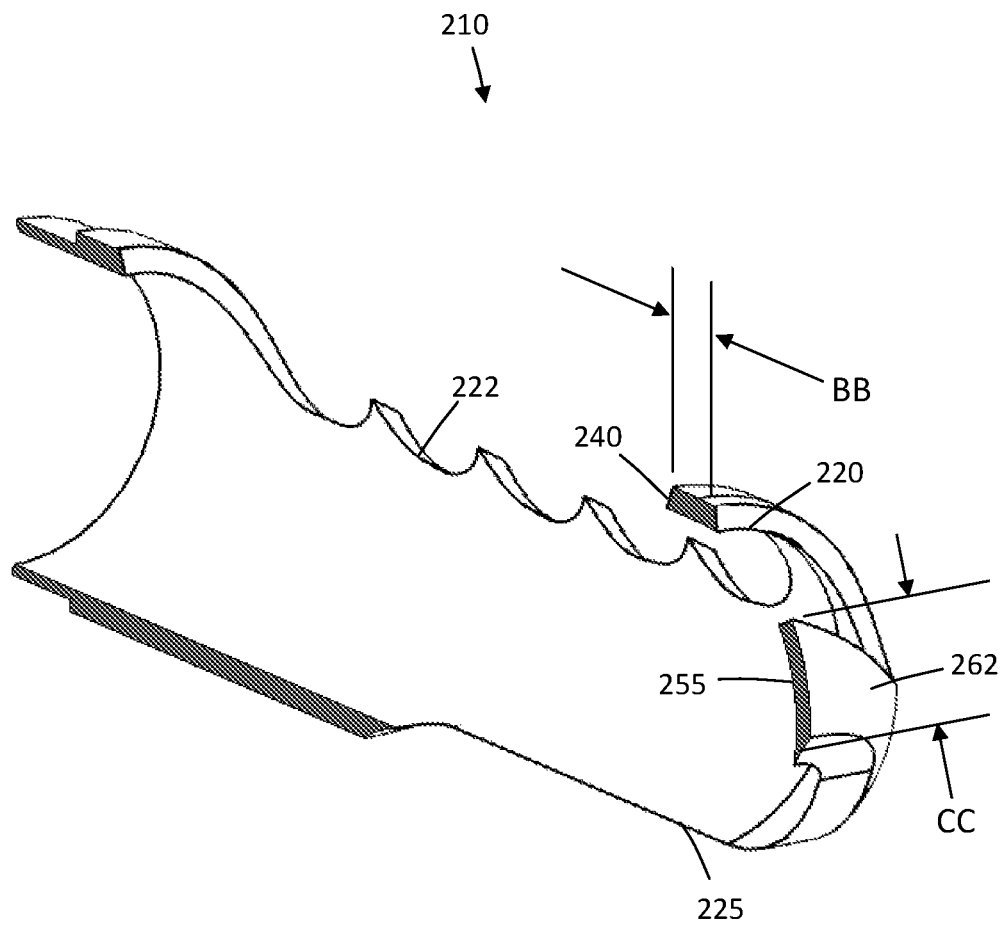
FIG. 18 is another longitudinal sectional view of the outer sleeve of FIG. 15B showing the dimensions of bridging elements are adapted to add hoop strength to the outer sleeve.

Now turning to FIG. 18, another feature relating to the outer sleeve 210 and the dimensions of the bridge elements 240 and 255 as measured in longitudinal plane LP (see FIG. 17A). The bridge elements 240, 255 improve hoop strength and structural integrity to the outer sleeve 210 during high-speed rotation of the inner cutting sleeve 215. In one variation, the longitudinal surface dimension BB of the first bridging element 245 is at least 0.5 mm. Similarly, the dimension CC of the second bridging element 255, when measured at a tangent to the centerline of surface 262 of the bridging element is at least 0.5 mm.

In a specific example, the working end 200 of FIGS. 13A and 14 has an outer sleeve 210 with an O.D. of 3.93 mm and a motor-driven, rotating inner sleeve 215 with an O.D. of 3.385 mm. The primary window 222 in outer sleeve 210 has an axial length of 9.5 mm. The secondary window 225 has an axial length area of 6.8 mm, and the distal window 220 has an axial dimension of 1.57 mm measured at a tangent as described above or an angle of 830 as described above. The primary window 222 has a width of 1650 measured in a radial angle. The secondary window 225 has a width of 270 measured in a radial angle, and the distal window 220 has a width of approximately 1600 in such a radial angle. The primary window 222 has an area of 32 mm2, the secondary window 225 has an area of 6 mm2 and the distal window 220 has an area of 3.2 mm2. In this example, the first bridging element 240 has an axial dimension BB of 0.72 mm, and the second bridging element 255 has a dimension CC of 1.48 mm when measured as described above in FIG. 18.

In general, the resecting devices described herein can comprise an elongated shaft 205 extending about a longitudinal axis 206 to a working end, the shaft comprising coaxial outer and inner sleeves, 201 and 215, wherein the inner sleeve has cutting edges that are rotatable in the bore of the outer sleeve, and where the outer sleeve has a primary window in a superior side thereof and a distal window in a distal tip thereof, with wall portion of the outer sleeve forming a bridge intermediate the primary window and the distal window. Such a bridge portion 240 extends between circumferentially spaced-apart lateral sides of the primary window and the distal window in a transverse plane that is between 0° and 45° from being orthogonal to the longitudinal axis 206.

Figure 19:
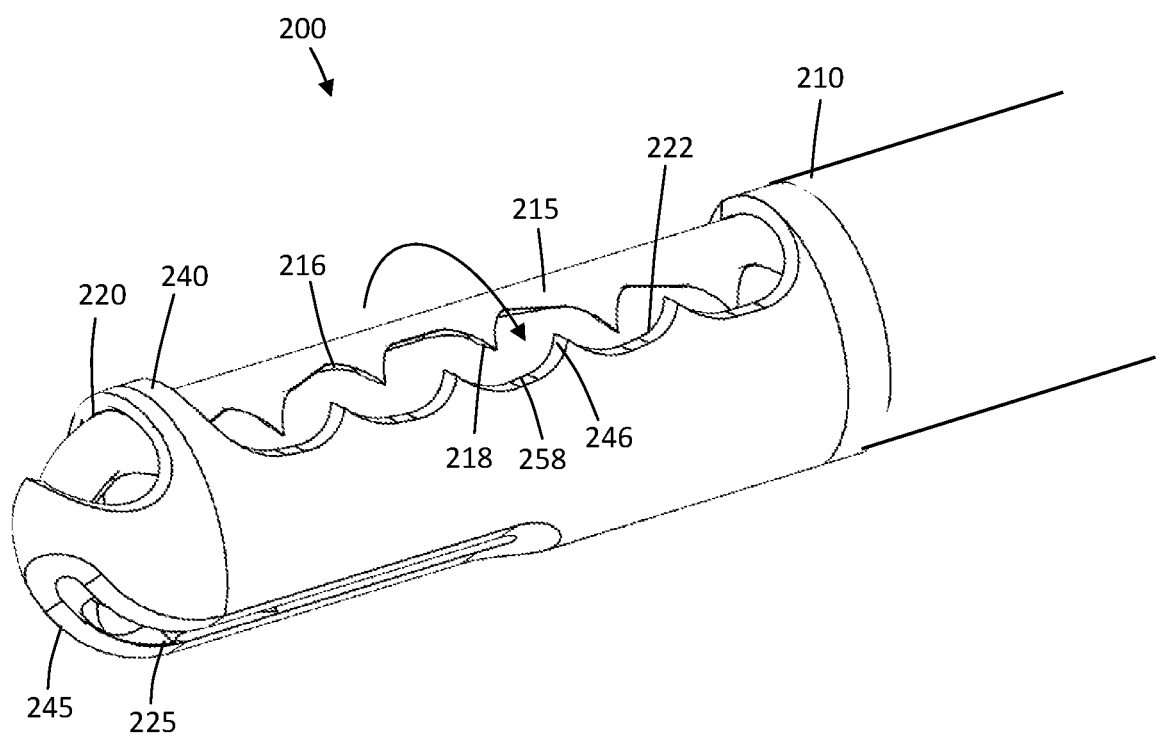
FIG. 19 is another view of the working end of FIGS. 13A and 14 showing the rotation of the inner sleeve relative to the outer sleeve where the teeth of the inner sleeve window are rotationally aligned with the notches between the teeth of the outer sleeve window.

FIG. 19 is an illustration of the working end 200 of FIGS. 13A and 14 from a different angle showing the rotation of the inner sleeve 215 relative to the outer sleeve 210. It can be seen that the teeth 218 of cutting window 216 of inner sleeve 215 are configured to rotate and cut in alignment with the notches 258 between the teeth 246 in the outer sleeve 210.

Figure 20:
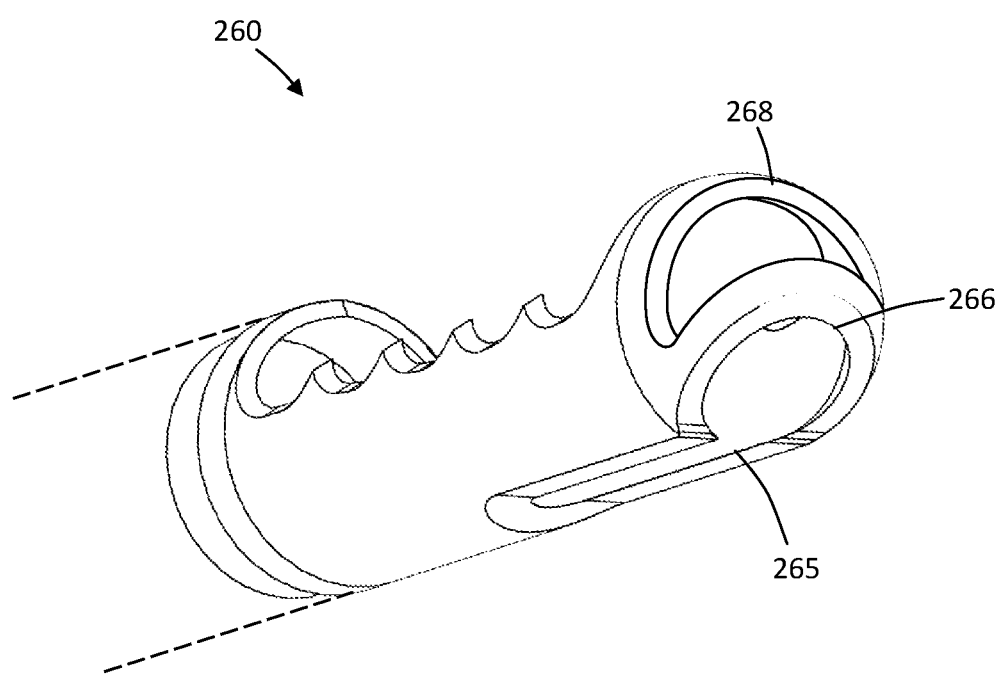
FIG. 20 is another variation of a working end of the outer sleeve of a working end similar to that of FIGS. 13A and 14 a secondary window with an enlarged distal region for cutting aggressively with the distal probe tip.

Now turning to FIG. 20, another variation of an outer sleeve 260 is shown that is similar to that of FIG. 15B except that the second inferior cutting window 265 has a non-uniform width. In this variation, the secondary cutting window 265 has an enlarged width portion 266 in a distal end of the window, which is adapted for resecting tissue with a distal tip 208 of the probe.

Figure 21:
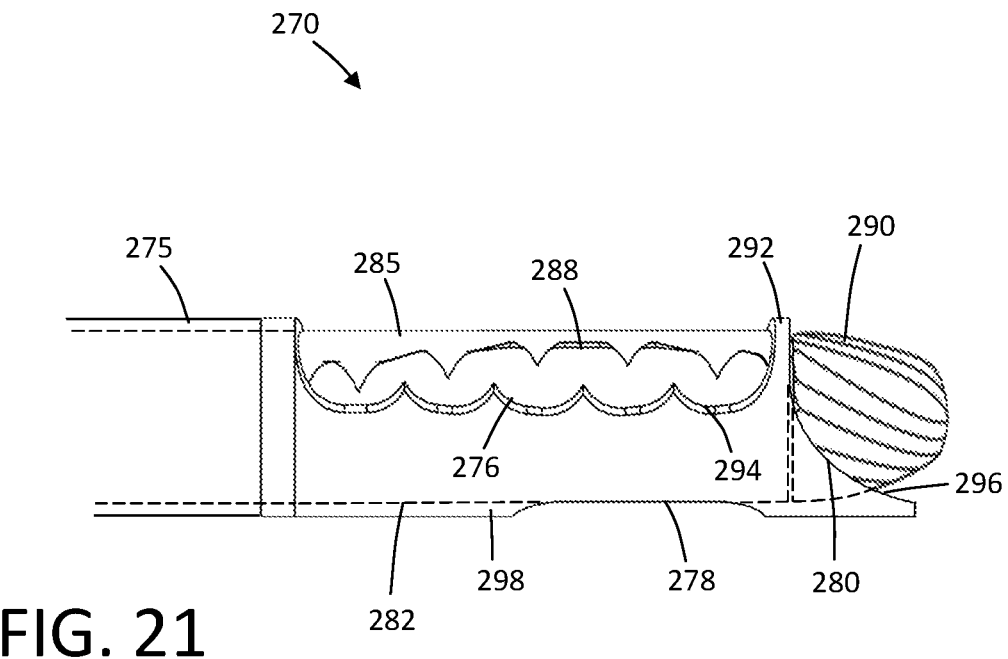
FIG. 21 is another variation of a probe working end similar to that of FIGS. 13A and 14 except that the rotating inner sleeve carries a distal burr in addition to a proximal cutting window.

FIG. 21 illustrates another variation of a working end 270 that is adapted for resection of hard tissue, such as a calcified fibroid. In this variation, the working end 270 has an outer sleeve 275 with a primary cutting window 276, a secondary cutting window 278, and a distal-facing cutting window 280. In this variation, the distal cutting window comprises the open-ended bore 282 in the outer sleeve 275. The working end 270 includes an inner sleeve 285 with a cooperating inner cutting window 288 for resecting tissue as described previously. The inner sleeve 285 also carries a distal burr 290 that is exposed in the distal cutting window 280. The distal burr 290 is configured for burring or grinding hard tissue rather than resecting discrete tissue chips. In this variation, the bridging element 292 is similar to that described previously and is adapted to maintain rotation of the inner sleeve 285 and distal burr 290 in close contact with the lateral edges 294 of the primary outer sleeve cutting window 276 and the lateral edges 296 around a distal facing window 280. It can be understood that without the bridging element 292, the inner and outer sleeves 275, 285 could be bent away from one another by tissue being trapped between the inner and outer sleeves (275,285) which would prevent effective tissue shearing or could jam the tool. For this reason, the bridging element 292 is important for maintaining the inner sleeve 285 in close proximity to surface of bore 282 for shearing tissue in the cooperating inner sleeve and outer sleeve windows (276, 288) as well as between the burr 290 and the edges of distal-facing window 280. In this variation, the distal window 280 comprises the full diameter of the bore 282 in outer sleeve 275, but it should be appreciated that the distal window 280 can be smaller as described in previous variations. The secondary window 278 in the inferior surface 298 of the outer sleeve 275 can have any suitable length as described previously.

Figure 22:
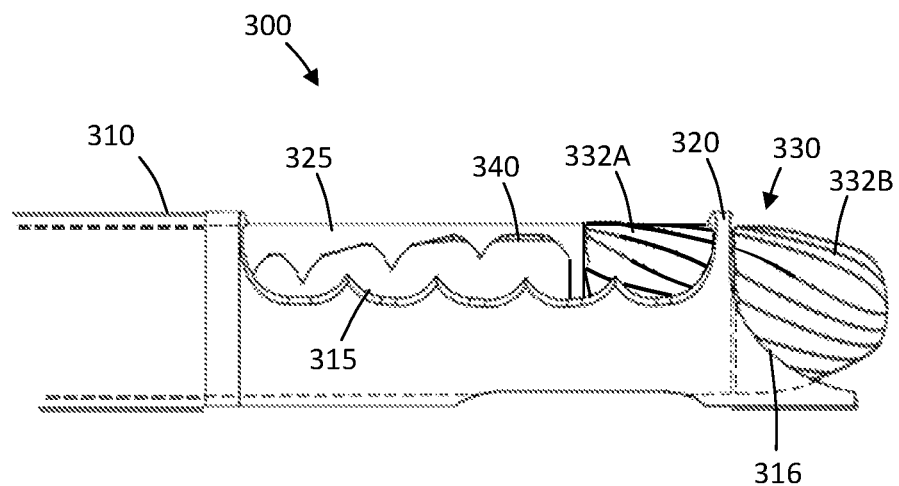
FIG. 22 is another variation of a working end similar to that of FIG. 21 with an elongated burr.

Now turning to FIG. 22, another variation of working end 300 is shown that is similar to that of FIG. 21. In this variation, the outer sleeve 310 again has a primary window 315, a distal-facing cutting window 316 with an intermediate bridging element 320 that is configured for maintaining rotation of the inner sleeve 325 in close proximity to the outer sleeve windows 315 and 316. The variation of FIG. 22 differs from that of FIG. 21 in that the burr 330 has a proximal burr portion 332A and a distal burr portion 332B disposed on either side of bridging element 320. The inner sleeve 325 again has a conventional resecting window 340 proximal to the burr 330. In all other respects, the working end 300 operates as previously described. In general, the working ends of FIGS. 21 and 22 provide an inner cutting sleeve 285, 325 that include conventional open cutting windows (288, 340) for resecting large tissue chips as well as a burr (290, 330) for cutting and grinding hard tissue.

Although particular variations of the present invention have been described above in detail, it will be understood that this description is merely for purposes of illustration and the above description of the invention is not exhaustive. Specific features of the invention are shown in some drawings and not in others, and this is for convenience only, and any feature may be combined with another in accordance with the invention. A number of variations and alternatives will be apparent to one having ordinary skills in the art. Such alternatives and variations are intended to be included within the scope of the claims. Particular features that are presented in dependent claims can be combined and fall within the scope of the invention.

Other variations are within the spirit of the present invention. Thus, while the invention is susceptible to various modifications and alternative constructions, certain illustrated variations thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. All methods described herein can be performed in any suitable order unless otherwise indicated herein or otherwise clearly contradicted by context. The use of any and all examples or exemplary language (e.g., "such as") provided herein, is intended merely to better illuminate variations of the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

What is claimed is:

1. A surgical instrument for resecting tissue, comprising:
   a shaft extending about a longitudinal axis to a working end, the shaft comprising an outer sleeve and an inner sleeve arranged co-axially, wherein the inner sleeve is rotatable relative to the outer sleeve, wherein the outer sleeve comprises a rounded distal tip;
   a plurality of first cutting edges located at a distal portion of the inner sleeve, wherein the plurality of first cutting edges comprises a point formed by arcuate sides of the first cutting edges that meet at the point, wherein the arcuate sides are configured to cut tissue at an oblique angle with respect to the longitudinal axis when the inner sleeve is rotated, wherein the plurality of first cutting edges comprises a plurality of lateral cutting edges extending along the longitudinal axis in an axial direction, wherein the plurality of lateral cutting edges transition to the arcuate sides;
   a primary window located in a superior side of the outer sleeve;
   a secondary window in an inferior side of the outer sleeve, wherein the secondary window comprises a plurality of second cutting edges, the secondary window partially extending around the rounded distal tip;
   a distal window at the rounded distal tip of the outer sleeve; and
   the outer sleeve further including a bridge portion intermediate to the primary window and to the distal window, wherein an entirety of a first side of the bridge portion adjacent to the primary window, an entirety of a second side of the bridge portion adjacent to the distal window, and a transverse centerline extend at an angle oblique with respect to the longitudinal axis.

2. The surgical instrument of claim 1, wherein the plurality of first cutting edges of the inner sleeve are exposed in both the primary window and the distal window during rotation of the inner sleeve.

3. The surgical instrument of claim 1, wherein the plurality of first cutting edges of the inner sleeve comprise a plurality of burr edges.

4. The surgical instrument of claim 1, wherein a wall portion of the outer sleeve is intermediate the secondary window and the distal window.

5. The surgical instrument of claim 1, wherein a width of the primary window extends over a radial angle greater than 120 degrees over an axial length thereof and the width of the secondary window extends over a radial angle less than 60 degrees over the axial length thereof.

6. The surgical instrument of claim 1, wherein a wall portion of the outer sleeve intermediate to the secondary window and the distal window has a dimension of at least 0.5 mm about a tangent to a wall surface.

7. The surgical instrument of claim 1, wherein the bridge portion of the outer sleeve intermediate to the primary window and the distal window has an axial dimension across of at least 0.5 mm about a tangent to a wall surface.

8. The surgical instrument of claim 1, wherein a ratio of an area of the distal window to an area of the primary window ranges from 0.1:1 to 0.8:1.

9. A surgical instrument for resecting tissue, comprising:
   an elongated shaft extending about a longitudinal axis comprising an inner sleeve coaxial with an outer sleeve having a rounded distal tip, wherein the inner sleeve is rotatable in the outer sleeve;
   a plurality of cutting edges on the inner sleeve, wherein the plurality of cutting edges comprises a point formed by arcuate sides of the cutting edges that meet at the point, wherein the arcuate sides are configured to cut tissue at an oblique angle with respect to the longitudinal axis when the inner sleeve is rotated, wherein the plurality of cutting edges comprises a plurality of lateral cutting edges extending along the longitudinal axis in an axial direction, wherein the plurality of lateral cutting edges transition to the arcuate sides;
   wherein the inner sleeve has an inner cutting window in a distal end thereof; and
   wherein the outer sleeve has a first window, a second window and a third window and a first bridge element intermediate to the first window and the second window, and a second bridge element intermediate to the second window and a third window, wherein the second window comprises an outer cutting window, wherein the second window and the third window partially extend around the rounded distal tip, wherein an entirety of a first side of the first bridge element adjacent to the first window, an entirety of a second side of the first bridge element adjacent to the second window, and a transverse centerline extend oblique with respect to the longitudinal axis.

10. The surgical instrument of claim 9, wherein the plurality of cutting edges of the inner sleeve are exposed in both the first window and the second window during rotation of the inner sleeve.

11. The surgical instrument of claim 9, wherein the plurality of cutting edges of the inner sleeve comprises a plurality of burr edges.

12. The surgical instrument of claim 9, wherein the third window is on an inferior side of the outer sleeve.

13. The surgical instrument of claim 9, wherein a width of the first window extends over a radial angle greater than 120 degrees over an axial length thereof and the width of the third window extends over a radial angle less than 60 degrees over the axial length thereof.

14. The surgical instrument of claim 9, wherein the first bridge element of the outer sleeve intermediate to the first window and the second window has an axial dimension across of at least 0.5 mm about a tangent to a wall surface.

15. The surgical instrument of claim 9, wherein the second bridge element has a dimension of at least 0.5 mm about a tangent to a wall surface.

* * * * *